United States Patent
Sakurada et al.

(10) Patent No.: US 11,834,075 B2
(45) Date of Patent: Dec. 5, 2023

(54) MASS TRANSPORTATION VEHICLE AND DISPATCH MANAGEMENT DEVICE OF AUTONOMOUS VEHICLE

(71) Applicant: TOYOTA JIDOSHA KABUSHIKI KAISHA, Aichi-ken (JP)

(72) Inventors: Shin Sakurada, Toyota (JP); Katsuya Hoshi, Nisshin (JP); Hiroaki Sugiyama, Nagoya (JP); Masahisa Sawada, Nagoya (JP); Hiroyuki Ito, Kariya (JP); Makoto Segi, Kariya (JP); Hiroki Hattori, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 75 days.

(21) Appl. No.: 17/678,036

(22) Filed: Feb. 23, 2022

(65) Prior Publication Data
US 2022/0266872 A1 Aug. 25, 2022

(30) Foreign Application Priority Data

Feb. 25, 2021 (JP) ................................. 2021-028078

(51) Int. Cl.
| | | |
|---|---|---|
| *B60W 60/00* | (2020.01) | |
| *G01C 21/36* | (2006.01) | |
| *G06Q 10/0631* | (2023.01) | |
| *G01C 21/34* | (2006.01) | |

(52) U.S. Cl.
CPC ... *B60W 60/00253* (2020.02); *G01C 21/3415* (2013.01); *G01C 21/3691* (2013.01); *G06Q 10/06311* (2013.01); *B60W 2540/215* (2020.02)

(58) Field of Classification Search
CPC ...... B60W 60/00253; B60W 2540/215; G01C 21/3415; G01C 21/3691; G01C 21/3605; G06Q 10/06311; G08G 1/123; G08G 1/096708
See application file for complete search history.

(56) References Cited

U.S. PATENT DOCUMENTS

| | | | | |
|---|---|---|---|---|
| 2014/0012498 A1* | 1/2014 | Gustafson | ........... | G01C 21/3423 701/537 |
| 2018/0275661 A1* | 9/2018 | Glaser | ................ | G01C 21/3423 |

FOREIGN PATENT DOCUMENTS

| | | |
|---|---|---|
| JP | 2003168192 A | 6/2003 |
| JP | 2004-164256 A | 6/2004 |
| JP | 2006-338297 A | 12/2006 |
| JP | 2018169992 A * | 11/2018 |

* cited by examiner

*Primary Examiner* — Vivek D Koppikar
*Assistant Examiner* — Jeffrey R Chalhoub
(74) *Attorney, Agent, or Firm* — HAUPTMAN HAM, LLP

(57) ABSTRACT

A mass transportation vehicle includes a stop selector and a dispatcher. The stop selector is configured to enable a passenger on the mass transportation vehicle to select a destination stop at which the passenger plans to get off. The dispatcher is configured to book dispatch of an autonomous vehicle to which the passenger transfers after getting off the mass transportation vehicle at the destination stop. The dispatcher sends information about the destination stop to a dispatch management device of the autonomous vehicle as information about a waiting point of the autonomous vehicle.

9 Claims, 21 Drawing Sheets

MASS TRANSPORTATION VEHICLE AND DISPATCH MANAGEMENT DEVICE OF AUTONOMOUS VEHICLE

CROSS REFERENCE TO RELATED APPLICATION

This application claims priority to Japanese Patent Application No. 2021-028078 filed on Feb. 25, 2021, which is incorporated herein by reference in its entirety including the specification, claims, drawings, and abstract.

TECHNICAL FIELD

The present disclosure relates to mass transportation vehicles and a dispatch management device of autonomous vehicles.

BACKGROUND

Mass transportation vehicles travel predefined operation routes and passengers get on and off at stops located along the operation routes. For example, JP 2003-168192 A discloses a mass transportation vehicle which includes stop buttons used to request a stop.

The present specification discloses mass transportation vehicles and an autonomous vehicle dispatch management device which can improve transportation services for passengers after getting off the mass transportation vehicles.

SUMMARY

A mass transportation vehicle according to an embodiment of the present disclosure travels along a predefined operation route, and passengers get on and off at stops located along the operation route. The mass transportation vehicle includes a stop selector and a dispatcher. The stop selector enables a passenger on the mass transportation vehicle to select a destination stop at which the passenger plans to get off. The dispatcher can book dispatch of an autonomous vehicle to which the passenger transfers after getting off the mass transportation vehicle at the destination stop. The dispatcher sends information about the destination stop to an autonomous vehicle dispatch management device as information about a waiting point of the autonomous vehicle.

This configuration can achieve a smooth transfer from the mass transportation vehicle to the autonomous vehicle because the autonomous vehicle is waiting at the destination stop when a passenger gets off the mass transportation vehicle.

In this configuration, the mass transportation vehicle may further include a congestion information acquirer, which is configured to acquire congestion information about the operation route from a current location of the mass transportation vehicle to the destination stop. When the destination stop is within a congested section, the stop selector extracts, as an alternative stop, a stop earlier than the congested section along the operation route. The stop selector includes a reset function to set the alternative stop as a new destination stop. The dispatcher sends information about the new destination stop to the autonomous vehicle dispatch management device as the information about the waiting point of the autonomous vehicle.

This configuration enables a passenger to transfer to the autonomous vehicle before the congested section. Because, unlike the mass transportation vehicle that must travel along a predefined operation route, the autonomous vehicle can freely select a travel route, the autonomous vehicle may set a travel route which avoids the congested section.

The mass transportation vehicle may further include a crowdedness estimator that is configured to estimate a crowdedness of the mass transportation vehicle. When the estimated crowdedness exceeds a predetermined threshold, the stop selector extracts, as an alternative stop, a stop earlier than the destination stop along the operation route. The stop selector includes a reset function to set the alternative stop as a new destination. The dispatcher sends information about the new destination stop to the autonomous vehicle dispatch management device as the information about the waiting point of the autonomous vehicle.

This configuration can attempt to reduce the crowdedness of the mass transportation vehicle by inviting passengers to get off the mass transportation vehicle at earlier stops.

The stop selector may exclude, from candidates of the destination stop, a stop within a predetermined short distance from a current location of the mass transportation vehicle.

This configuration can ensure a sufficient time duration required to book dispatch.

An in-vehicle terminal which includes the stop selector and the dispatcher may be disposed on a rear surface of a seatback of a seat on the opposite side of a back supporting surface of the seatback.

In this configuration, each in-vehicle terminal is positioned to facilitate operations by a passenger behind the seat to which the in-vehicle terminal is attached.

An autonomous vehicle dispatch management device according to another embodiment of the present disclosure includes a stop selector and a dispatch booking setter. The stop selector is configured to send a selection image to a mobile terminal carried by a passenger on a mass transportation vehicle which travels along a predefined operation route. The selection image allows the passenger to select a destination stop at which the passenger plans to get off. The dispatch booking setter is configured to obtain information about the selected destination stop and book dispatch of an autonomous vehicle to which the passenger transfers at the destination stop. The dispatch booking setter sets the information about the destination stop as information about a waiting point of the autonomous vehicle.

In this configuration, the autonomous vehicle dispatch management device may further include a congestion information acquirer that is configured to acquire congestion information about the operation route from a current location of the mass transportation vehicle to the destination stop. When the destination stop is within a congested section, the stop selector extracts, as an alternative stop, a stop earlier than the congested section along the operation route. The stop selector includes a reset function to set the alternative stop as a new destination stop. The dispatch booking setter sets the new destination stop as the waiting point of the autonomous vehicle.

The autonomous vehicle dispatch management device may further include a crowdedness estimator that is configured to estimate a crowdedness of the mass transportation vehicle. When the estimated crowdedness exceeds a predetermined threshold, the stop selector extracts, as an alternative stop, a stop earlier than the destination stop along the operation route. The stop selector includes a reset function to set the alternative stop as a new destination stop. The dispatch booking setter sets the new destination stop as the waiting point of the autonomous vehicle.

The stop selector may exclude, from candidates of the destination stop, a stop within a predetermined short distance from a current location of the mass transportation vehicle.

The mass transportation vehicle and the autonomous vehicle dispatch management device according to embodiments of the present disclosure can improve a transportation service for a passenger after getting off the mass transportation vehicle.

BRIEF DESCRIPTION OF DRAWINGS

Embodiments of the present disclosure will be described based on the following figures, wherein.

DESCRIPTION OF EMBODIMENTS

Figure 1:
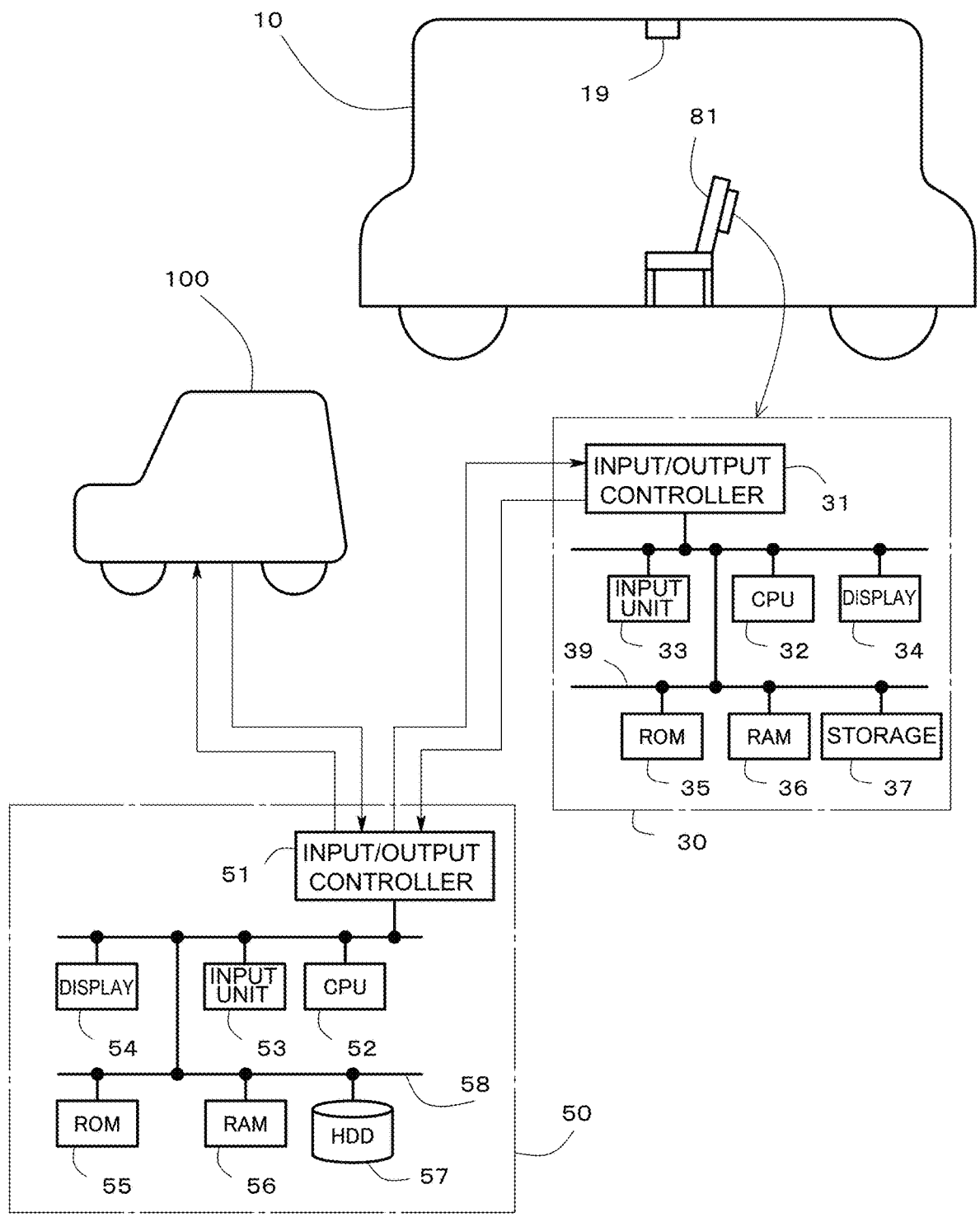
FIG. 1 is a hardware configuration diagram of an autonomous vehicle dispatch system according to an embodiment of the present disclosure.

Embodiments of the present disclosure are described below with reference to the attached drawings. The specifics, such as shapes, materials, numbers, and values in the description below are merely examples. These specifics may be changed as required in accordance with the specifications of the mass transportation vehicles and the autonomous vehicle dispatch management device. In the description below and the drawings, the same reference numerals are assigned to corresponding elements.

Overall Configuration

Figure 2:
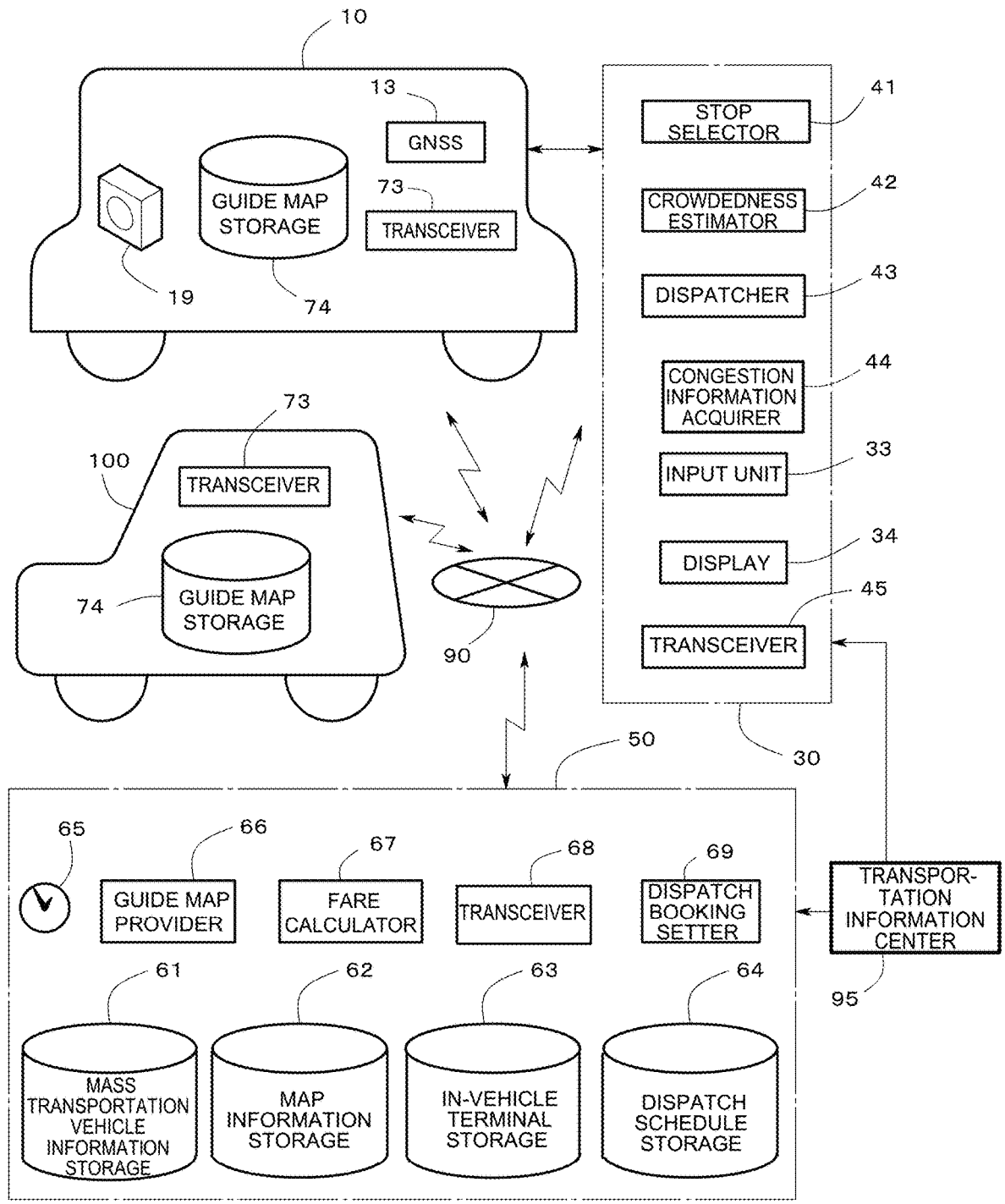
FIG. 2 is a functional block diagram of the autonomous vehicle dispatch system according to the embodiment of the present disclosure.

FIG. 1 shows a hardware configuration of an autonomous vehicle dispatch management system according to an embodiment of the present disclosure. FIG. 2 shows the system with functional blocks. In FIGS. 1 and 2, elements not directly related to the dispatch booking of an autonomous vehicle 100 are omitted. The autonomous vehicle dispatch management system according to an embodiment of the present disclosure includes a mass transportation vehicle 10, in-vehicle terminals 30, a dispatch management device 50, and the autonomous vehicle 100. The mass transportation vehicle 10, the in-vehicle terminals 30, the dispatch management device 50, and the autonomous vehicle 100 are connected in communication with each other via a communication means, such as the Internet 90.

As described in detail below, in an autonomous vehicle dispatch management system according to the present embodiment, the mass transportation vehicle 10 and the autonomous vehicle 100 are used as a bus and a driverless taxi, respectively. For example, a possible usage is that a user may take the mass transportation vehicle 10 to a stop near a destination because the fare is relatively low although the operation route is predefined, and then take the autonomous vehicle 100 to the destination because the destination can be freely set although the fare is relatively high.

In the autonomous vehicle dispatch management system according to the present embodiment, a passenger on the mass transportation vehicle 10 books dispatch through one of the in-vehicle terminals 30 before the mass transportation vehicle 10 arrives at the destination stop at which the passenger plans to get off. In such a dispatch booking, the destination stop of the passenger becomes a waiting point of, in other words, a boarding point to, the autonomous vehicle 100. Such a dispatch booking enables a smooth transfer from the mass transportation vehicle 10 to the autonomous vehicle 100 after the passenger gets off the mass transportation vehicle 10 at the destination stop. Concerning this transfer, the passenger of the mass transportation vehicle 10 becomes a user of the autonomous vehicle 100.

Mass Transportation Vehicle

Figure 3:
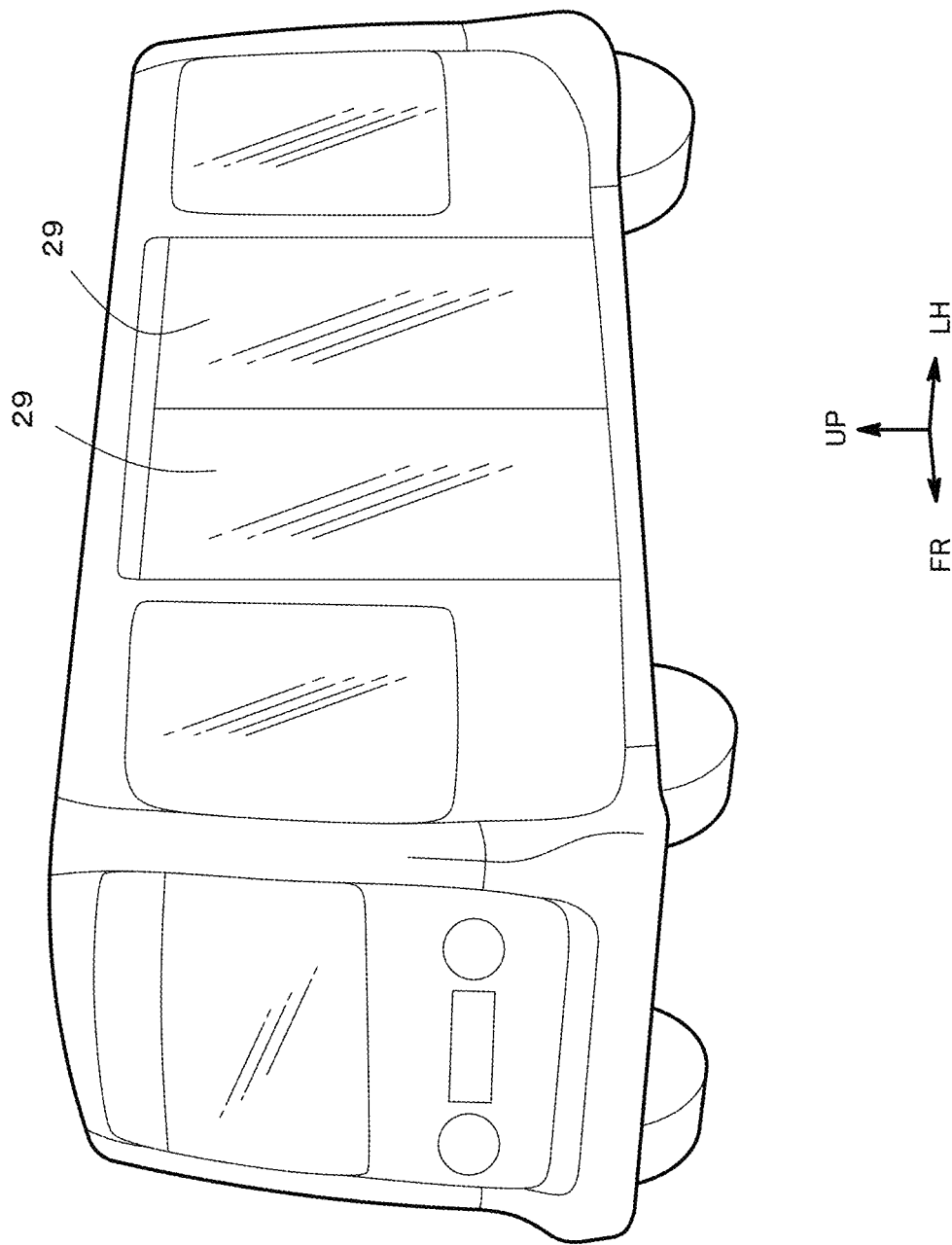
FIG. 3 is a perspective diagram of an exterior of the mass transportation vehicle according to the embodiment of the present disclosure.
Figure 4:
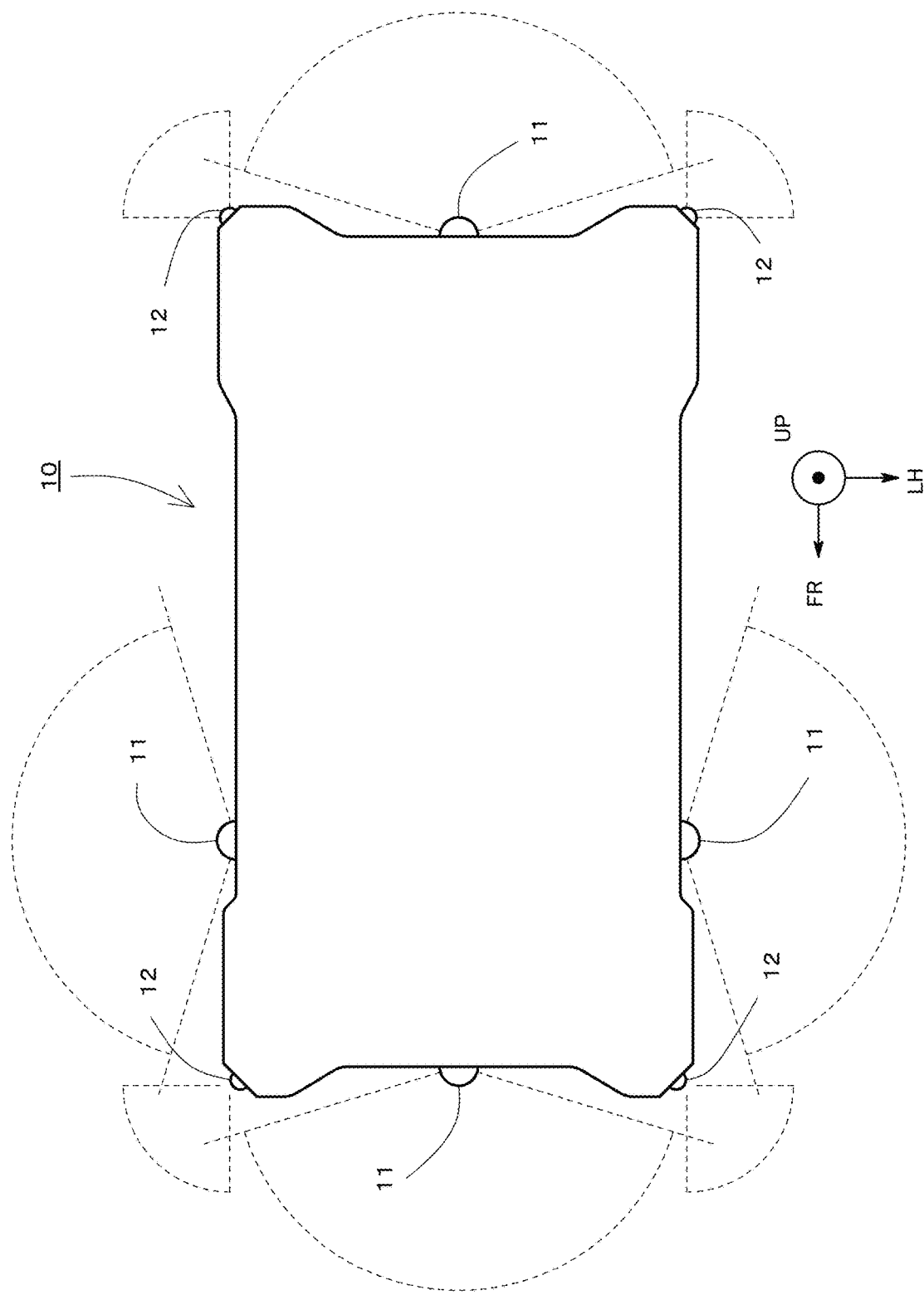
FIG. 4 is a plan view of the mass transportation vehicle according to the embodiment of the present disclosure, showing locations of sensors.

FIGS. 3 to 7 show a structure of the mass transportation vehicle 10 according to an embodiment of the present disclosure. In FIGS. 3 and 4, the axes shown by symbols FR, LH (left-hand), and UP indicate a vehicle longitudinal direction, a vehicle lateral direction, and a vehicle vertical direction, respectively.

FIG. 3 is a perspective view, showing an exterior of the mass transportation vehicle 10 according to an embodiment of the present disclosure. The mass transportation vehicle 10 may be an autonomous vehicle. The mass transportation vehicle 10 may be capable of, for example, level 0 (fully manually driven) to level 5 (fully autonomously driven) traveling according to the US-based SAE International.

Figure 8:
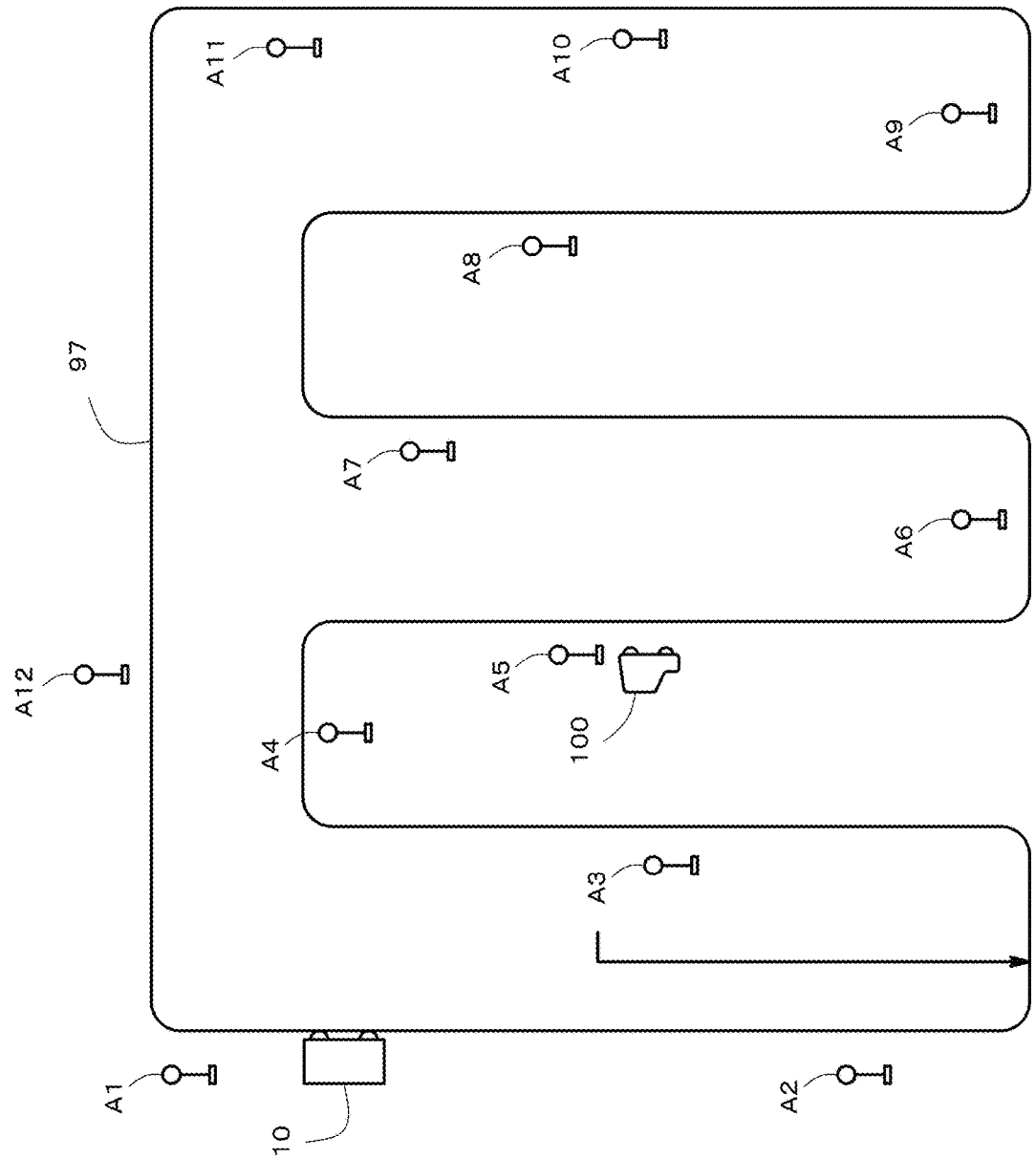
FIG. 8 is a diagram which shows a difference in traveling aspects between the mass transportation vehicle and the autonomous vehicle according to the embodiment of the present disclosure.

The mass transportation vehicle 10 is used as a bus which autonomously travels to transport passengers along a pre-defined operation route. For example, as shown in FIG. 8, the mass transportation vehicle 10 travels along a predefined operation route 97. Passengers get on and off at stops A1 to A12 located along the operation route 97. When the mass transportation vehicle 10 travels, the autonomous driving level may be set to, for example, level 4 or 5.

As shown in FIG. 3, a boarding door 29 is disposed on the left at the center of the mass transportation vehicle 10. The boarding door 29 may be a double-wing slide door which slides open along the vehicle longitudinal direction.

Figure 5:
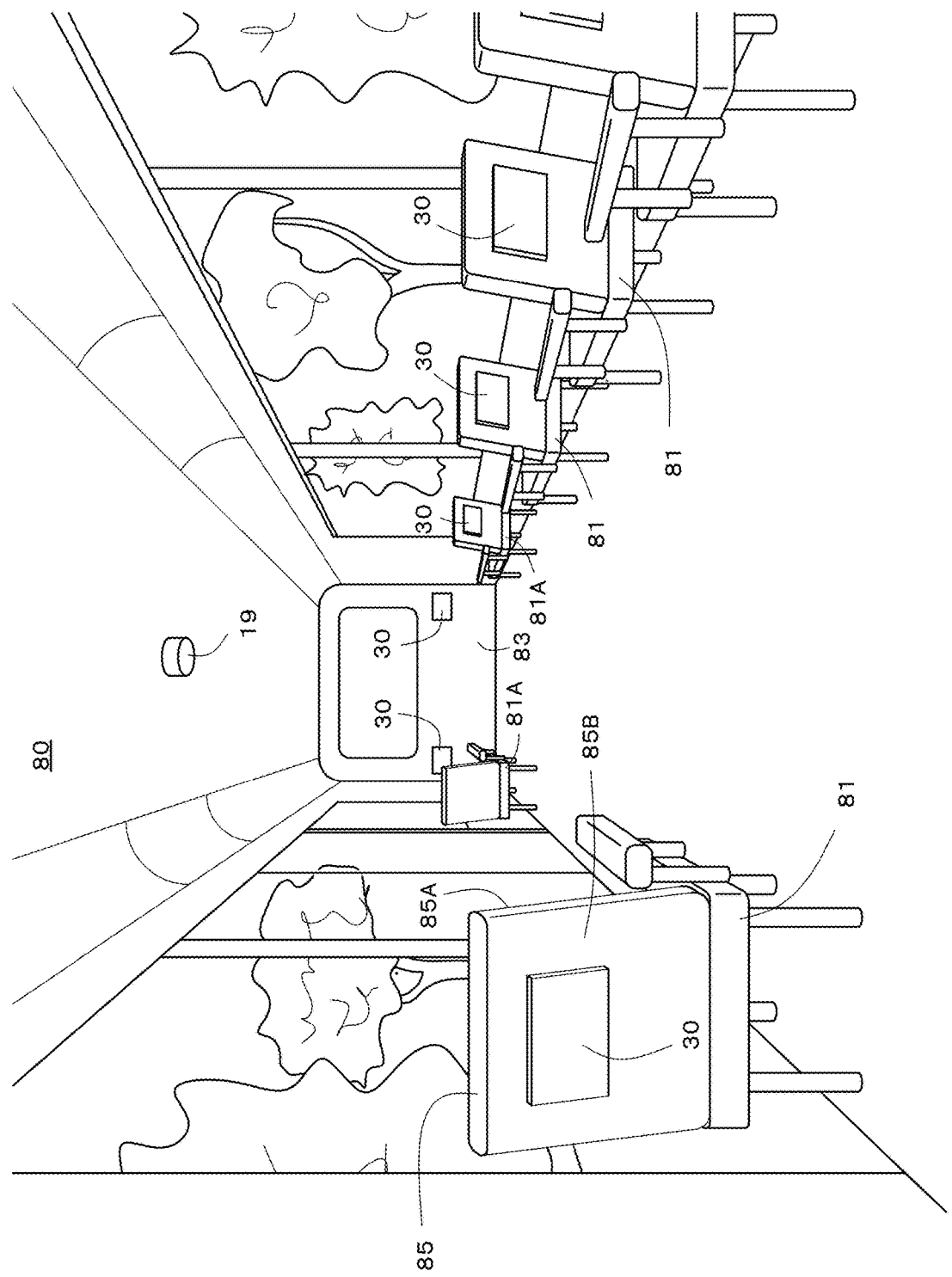
FIG. 5 is a diagram of an interior of the mass transportation vehicle according to the embodiment of the present disclosure.

FIG. 5 shows an interior of a passenger compartment 80 of the mass transportation vehicle 10. The passenger compartment 80 includes multiple seats 81. For example, the seats 81 are lined up in a single line on both sides in the passenger compartment 80. Each in-vehicle terminal 30 is provided on a rear surface 85B of a seatback 85 of the seat 81. The rear surface 85B is the surface opposite to the front surface 85A that supports the back of a passenger. The in-vehicle terminal 30 is operated by a passenger who sits on the seat 81 which is one seat behind the seat 81 to which the in-vehicle terminal 30 is attached. The in-vehicle terminal 30 is disposed to face the passenger, ensuring optimized operability for the passenger. The in-vehicle terminal 30 is also disposed on a front wall 83 of the passenger compartment 80 on each side for a passenger who is sitting on the front-most seat 81A. The in-vehicle terminal 30 is described in detail further below.

An in-vehicle camera 19 is disposed in the passenger compartment 80. The in-vehicle camera 19 may include an image sensor, such as a CMOS or CCD sensor. The in-vehicle camera 19 may be disposed on the ceiling of the passenger compartment 80 to capture images of the entire passenger compartment 80. The in-vehicle camera 19 may be capable of capturing images of the entire floor of the passenger compartment 80. As described further below, interior images captured by the in-vehicle camera 19 may be used to estimate the crowdedness of the mass transportation vehicle 10.

Figure 6:
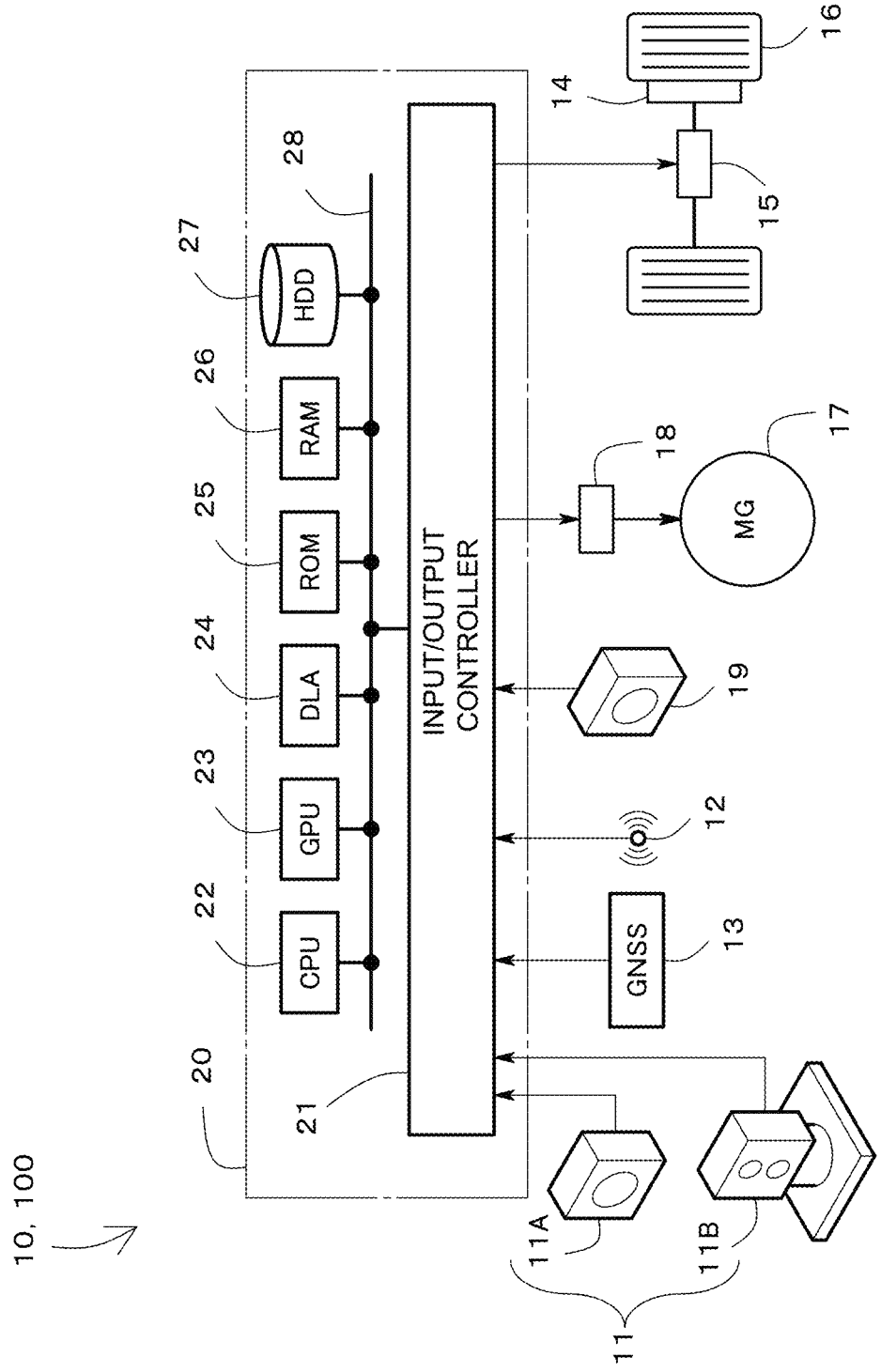
FIG. 6 is a diagram of a hardware configuration of the mass transportation vehicle and an autonomous vehicle according to the embodiment of the present disclosure.
Figure 7:
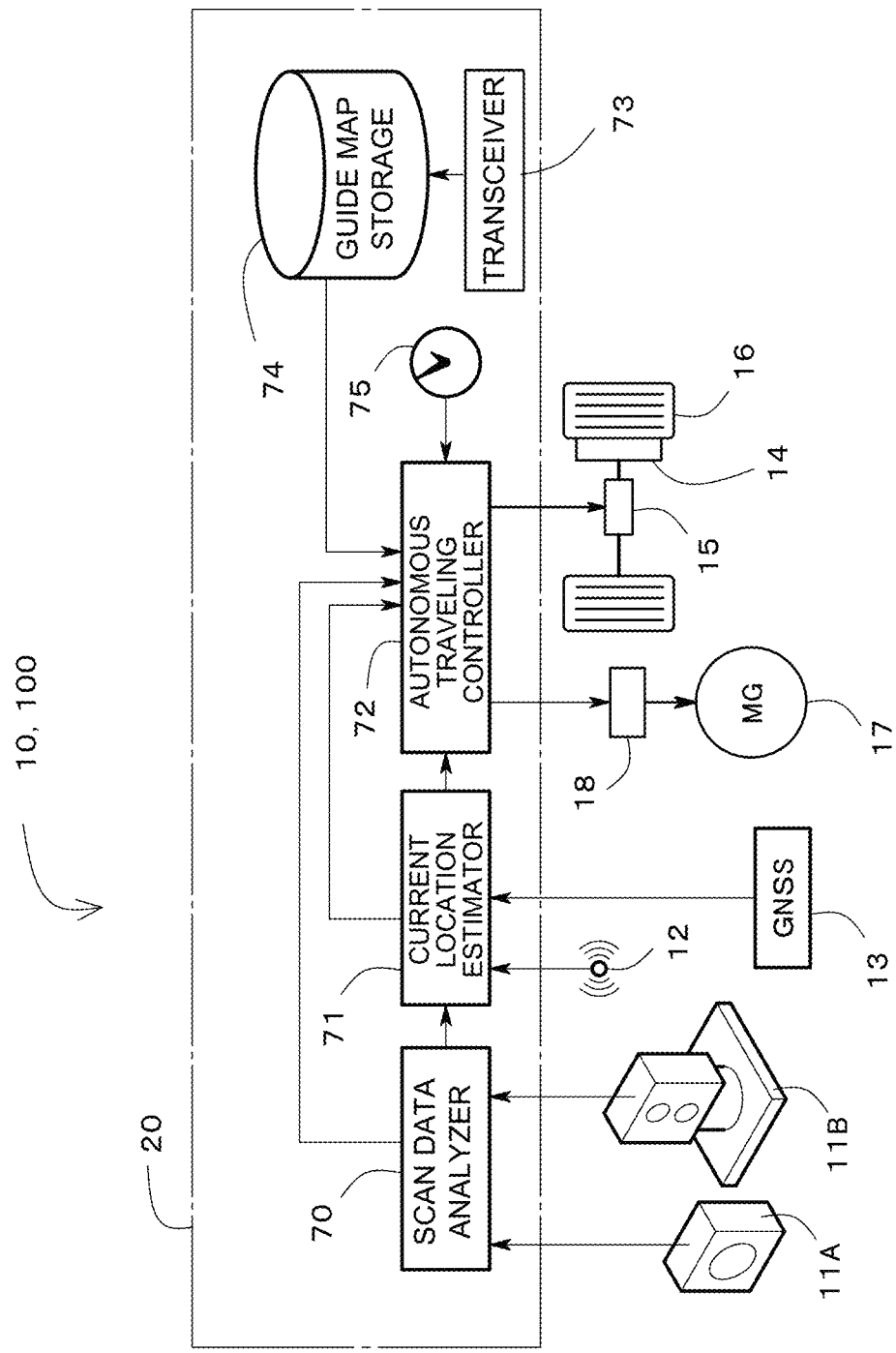
FIG. 7 is a functional block diagram of the mass transportation vehicle and the autonomous vehicle according to the embodiment of the present disclosure.

FIGS. 6 and 7 show configurations of the autonomous driving mechanism of the mass transportation vehicle 10 according to the present embodiment. As described further below, the configurations of the autonomous driving mechanism of the autonomous vehicle 100 are the same as those shown in the FIGS. 6 and 7. In other words, FIGS. 6 and 7 show examples of the autonomous driving configuration of the mass transportation vehicle 10 and the autonomous vehicle 100.

The mass transportation vehicle 10 is a battery electric vehicle (BEV) that uses a rotating electric machine 17 (motor) as a driving source and a battery (not shown) as a power source. The mass transportation vehicle 10 includes, as traveling control mechanisms, a steering mechanism 15 for steering wheels 16 and a braking mechanism 14 for braking the wheels 16. The mass transportation vehicle 10 also includes an inverter 18 that controls outputs of the rotating electric machine 17.

The mass transportation vehicle 10 further includes, as mechanisms to obtain the current own-location and observe surrounding conditions, external cameras 11A, LiDAR units 11B, proximity sensors 12, a navigator 13, and a controller 20.

As shown in FIG. 4, the mass transportation vehicle 10 includes sensor units 11 at the front, the rear, and on both sides. Each sensor unit 11 includes the external camera 11A (refer to FIG. 6) and the LiDAR unit 11B.

The LiDAR unit 11B is a sensor unit used for autonomous driving, using light detection and ranging (LiDAR) technology for measuring distances from peripheral objects using laser light. The LiDAR unit 11B includes an emitter that emits infrared laser light directed outward from the vehicle, a receiver that receives reflected light, and a motor that rotates the emitter and the receiver.

The emitter may emit infrared laser light outward from the vehicle. The receiver receives reflected light that returns after the laser light emitted from the emitter is reflected from an object around the mass transportation vehicle 10. The distance between the reflected point and the receiver is measured based on the elapsed time between the emission of light from the emitter and the receipt of light by the receiver. Laser beam can be scanned in horizontal and vertical directions using the emitter and receiver that are rotated by the motor, obtaining 3D point cloud data about surrounding conditions around the mass transportation vehicle 10.

Referring back to FIG. 6, each external camera 11A captures images of the same field of view coverage as the LiDAR unit 11B. The external camera 11A includes an image sensor, such as a CMOS or CCD sensor. The proximity sensors 12 may be infrared sensors. As shown in FIG. 4, the proximity sensors 12 may be disposed at the four corners of the mass transportation vehicle 10 in the plan view. For example, when the mass transportation vehicle 10 arrives at a stop, the proximity sensors 12 detect a raised portion such as a curb of a sideway. This detection enables a precise docking control to stop the mass transportation vehicle 10 close to the curb.

The navigator 13 is a system to navigate using satellites, for example a global navigation satellite system (GNSS). The navigator 13 enables an estimation of the current own-location (based on latitude and longitude) of the mass transportation vehicle 10.

The controller 20 may be a computer that is an electronic control unit (ECU) of the mass transportation vehicle 10. The controller 20 includes, as a hardware component, an input/output controller 21 that controls input and output of data. The controller 20 also includes, as arithmetic logic units, a CPU 22, a graphics processing unit (GPU) 23, and a deep learning accelerator (DLA) 24. The controller 20 further includes, as storage devices, a ROM 25, a RAM 26, and a hard disk drive (HDD) 27. A solid state drive (SSD) or other storage may be used in place of the HDD 27. These elements are connected to an internal bus 28.

At least one of the ROM 25 and the HDD 27, both of which are storages, stores a program to control autonomous driving of the mass transportation vehicle 10. With this program being performed by the CPU 22 or other unit of the controller 20, functional blocks, such as those in FIG. 7, are established in the controller 20. Specifically, the controller 20 includes, as functional blocks, a scan data analyzer 70, a current own-location estimator 71, an autonomous traveling controller 72, a transceiver 73, a guide map storage 74, and a clock 75.

The scan data analyzer 70 obtains images captured by the external cameras 11A and performs image recognition for the obtained captured images using well-known supervised deep learning methods, such as a single shot multibox detector (SSD) or you only look once (YOLO). The scan data analyzer 70 detects objects and recognizes attributes, such as vehicles, pedestrians, structures, or other objects, in the captured images through this image recognition.

The scan data analyzer 70 obtains 3D point cloud data from the LiDAR units 11B, and performs clustering to divide the 3D point cloud data into multiple clusters. The scan data analyzer 70 generates surroundings data in which the coordinates of the captured images and the 3D point cloud data are overlapped with each other after completion of image recognition of the captured images and clustering of the 3D point cloud data. The attributes of objects and the distances between the vehicle and the objects can be detected based on the surroundings data. The surroundings data is sent to the current own-location estimator 71 and the autonomous traveling controller 72.

The current own-location estimator 71 obtains the current own-location information (based on latitude and longitude) from the navigator 13. The current own-location estimator 71 may obtain the current own-location information from a satellite. Such current own-location information obtained from a satellite is known to have an error of about 100 m at maximum. The current own-location estimator 71 may correct the current own-location information obtained from the navigator 13. For example, the current own-location estimator 71 may obtain dynamic map data (described further below) around the current location stored in the guide map storage 74. The current own-location estimator 71 may perform matching between 3D images based on the dynamic map and surroundings images from the scan data analyzer 70. Such matching can present coordinates on the dynamic map, in other words, the current own-location. The information about the current own-location (information about the current location of the mass transportation vehicle 10) obtained in this manner is sent to the autonomous traveling controller 72.

The transceiver 73 has functions of a receiver that receives signals sent from external entities to the mass transportation vehicle 10, and a transmitter that transmits signals to external entities from the mass transportation vehicle 10. The transceiver 73 may receive guide map data sent from the dispatch management device 50. As described further below, the guide map data may include dynamic map data and operation route information. The guide map data received by the transceiver 73 is stored in the guide map storage 74.

The autonomous traveling controller 72 controls traveling of the mass transportation vehicle 10 based on the guide map data stored in the guide map storage 74, the current own-location information (information about the current location of the mass transportation vehicle 10) sent from the current own-location estimator 71, and the surroundings data sent from the scan data analyzer 70.

A rough route to travel may be determined based on the current own-location and the supplied operation route in the guide map data. A refined route may be determined based on the surroundings data to avoid obstacles on the way or to achieve other purposes. The autonomous traveling controller 72 controls the braking mechanism 14, the steering mechanism 15, and the inverter 18 in accordance with the determined operation route.

Autonomous Vehicle

Figure 9:
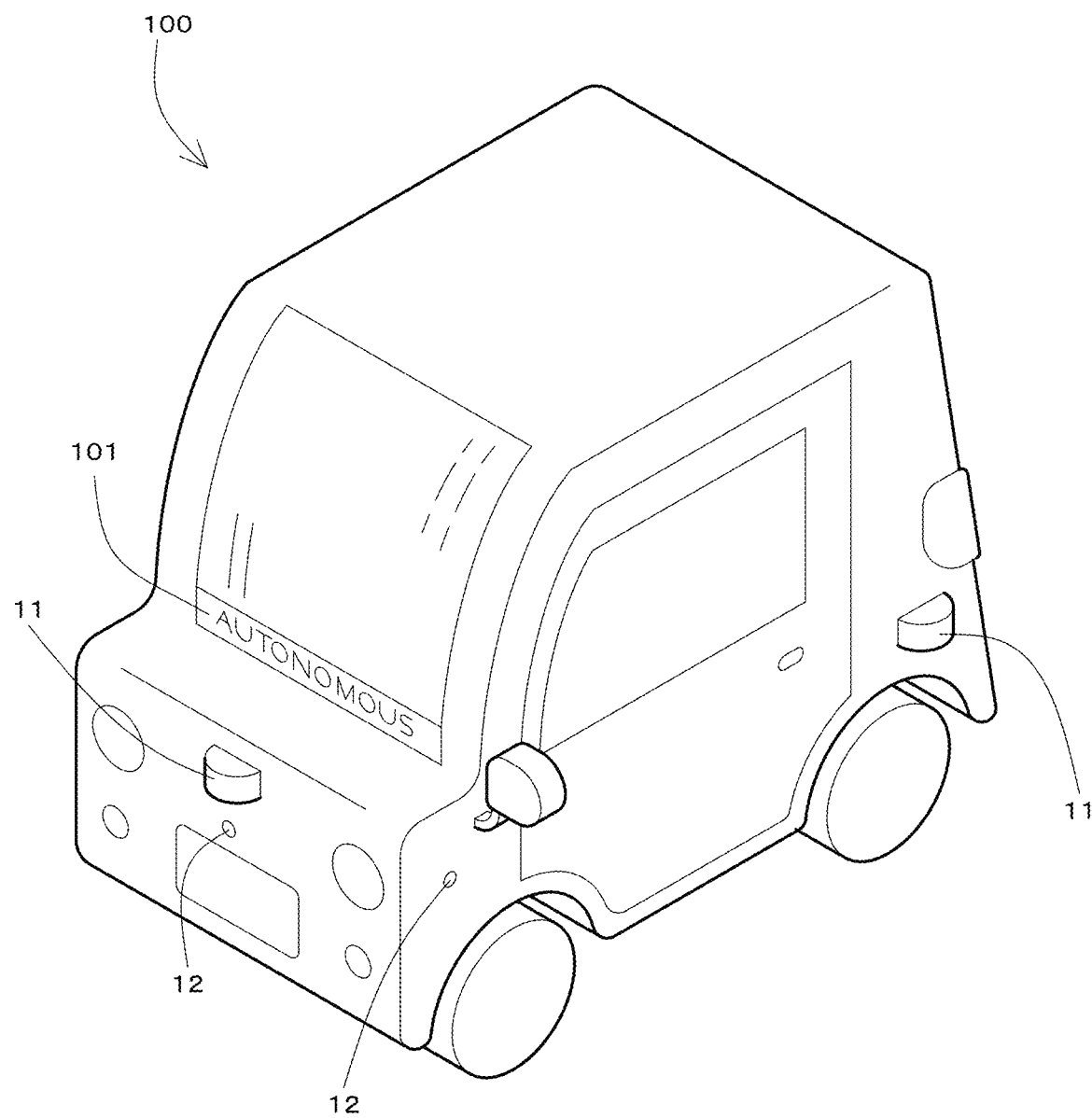
FIG. 9 is a personal mobility vehicle as an example of the autonomous vehicle according to the embodiment of the present disclosure.

FIG. 9 shows an exterior of the autonomous vehicle 100 according to an embodiment of the present disclosure. The autonomous vehicle 100 may be a small-size vehicle for one or two passengers. Such a vehicle is called a personal mobility vehicle or an ultra-compact mobility vehicle.

The autonomous vehicle 100 may be used as a driverless taxi. As described further below, information about the dispatched vehicle is sent from the dispatch management device 50 to the autonomous vehicle 100. The information about the dispatched vehicle may include a boarding point, a destination, a travel route from the boarding point to the destination, arrival time (pick-up time) to the boarding point, and a password required to use the autonomous vehicle 100. The autonomous vehicle 100 autonomously travels in accordance with this information about the dispatched vehicle. A fare is charged to the user, who is the passenger who has alighted from the mass transportation vehicle 10, based on a utilization time duration of the autonomous vehicle 100 or other factors.

As shown in FIG. 9, the autonomous vehicle 100 may include sensor units 11 and proximity sensors 12 at the front, the rear, and on both sides. The autonomous vehicle 100 also includes a digital signage 101 at the front. The digital signage 101 may be a liquid crystal display, which can display various messages. For example, the digital signage 101 may display operation status of the autonomous vehicle 100, such as "autonomous" to indicate an autonomous traveling mode, "vacant", or "hired".

The digital signage 101 may display an account name entered by a user when booked, if available. The autonomous vehicle 100 may also include a speaker to play a theme song set by a user when booked. With such announcement functions of the autonomous vehicle 100, users can easily find the autonomous vehicle 100 booked for the dispatch.

The autonomous vehicle 100 may include a credit card payment terminal (also referred to as a "credit card reader") (not shown). When the autonomous vehicle 100 reaches a destination, the fare from the boarding point to the destination is displayed on the payment terminal. When the user has their card read by the payment terminal in response to the display, the fare payment is processed.

Similarly to the mass transportation vehicle 10, the autonomous vehicle 100 may be capable of, for example, level 4 or 5 autonomous traveling defined by the US-based SAE International.

Such autonomous traveling of the autonomous vehicle 100 can be achieved with the hardware configuration and functional blocks shown in FIGS. 6 and 7. Because their functions are similar to those of the mass transportation vehicle 10, their description is omitted here.

In-Vehicle Terminal

As shown in FIG. 1, the in-vehicle terminal 30 is a communication terminal attached to the seat 81 of the mass transportation vehicle 10. The in-vehicle terminal 30 may be recognized as a function-extended version of a stop button provided in conventional mass transportation vehicles. The autonomous vehicle 100, which is a driverless taxi, can be called to a destination stop by selecting the destination stop before reaching the destination stop.

The in-vehicle terminal 30 may be a tablet terminal. FIG. 1 shows a hardware configuration of the in-vehicle terminal 30 according to an embodiment of the present disclosure. The in-vehicle terminal 30 may include an input/output controller 31, a CPU 32, an input unit 33, and a display 34. The in-vehicle terminal 30 may also include, as a storage, a ROM 35, a RAM 36, and a storage device 37. These elements are connected to an internal bus 39.

Figure 12:
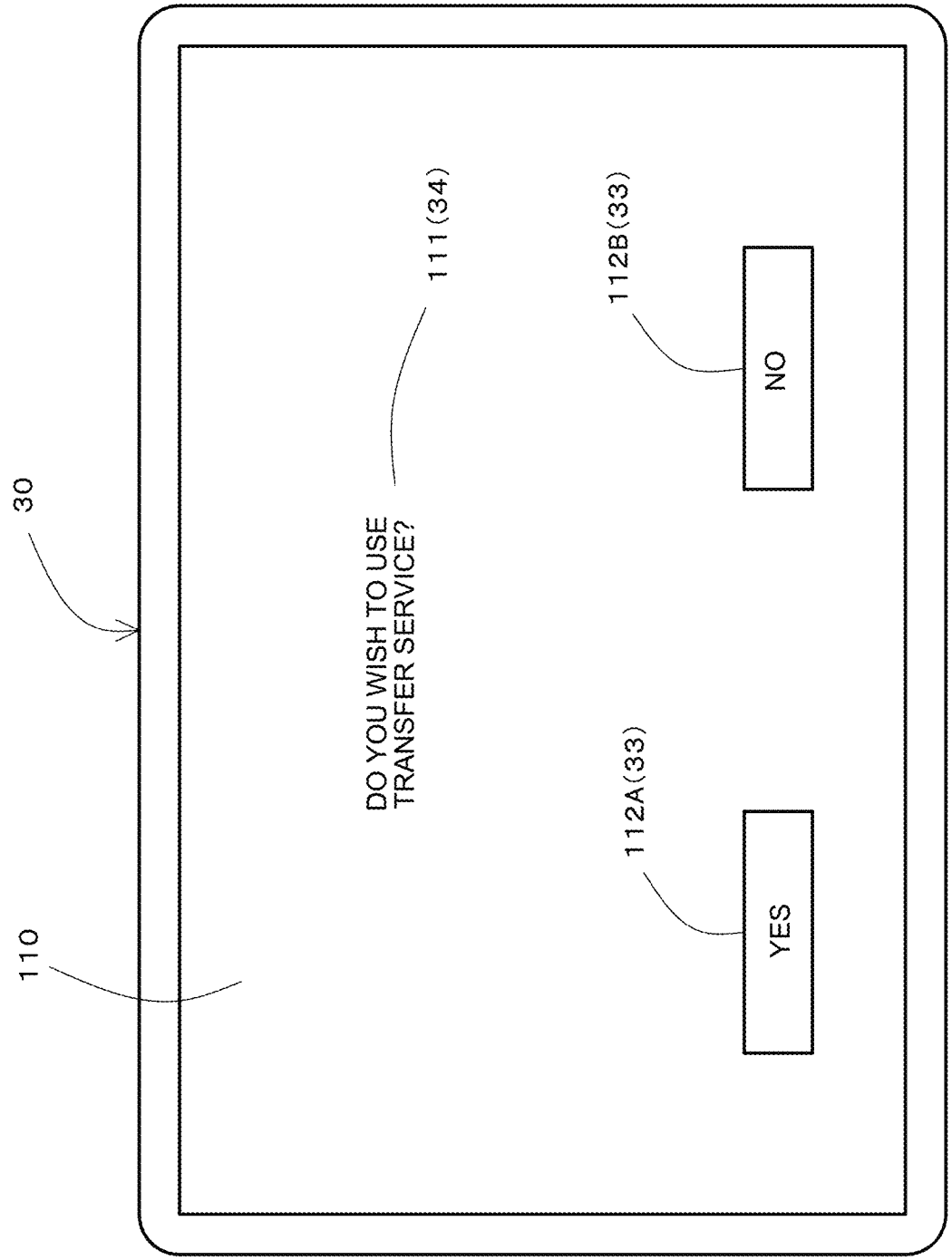
FIG. 12 is a diagram to describe a dispatch booking flow (1/7), showing an example of an initial screen.
Figure 13:
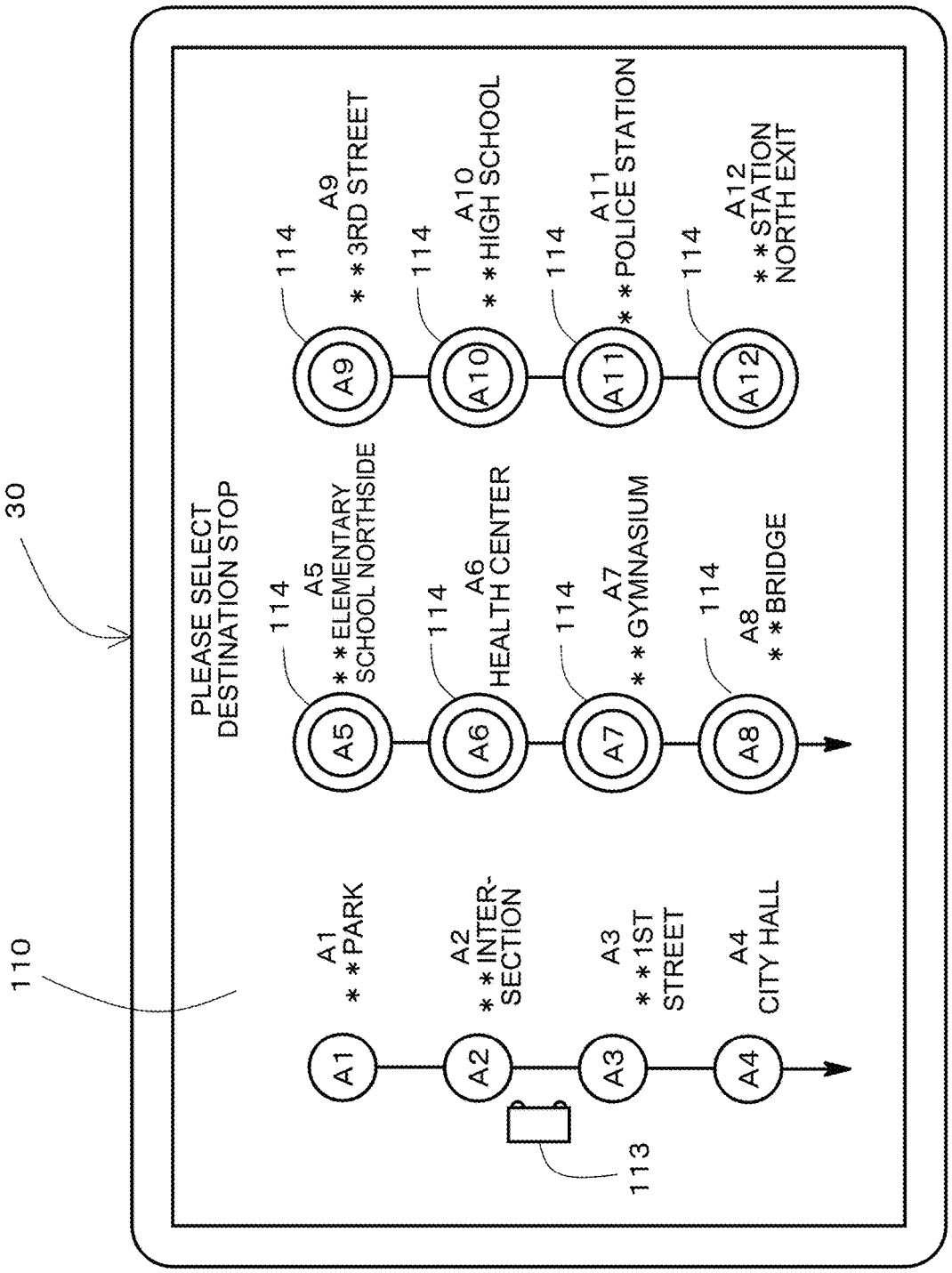
FIG. 13 is a diagram to describe the dispatch booking flow (2/7), showing an example of a destination stop selection screen.

The input unit 33 and the display 34 may be united as a touch panel 110 (refer to FIG. 12). As described further below, when booking the autonomous vehicle 100, the input unit 33 is used to input a destination stop, in other words, a boarding point to the autonomous vehicle 100.

At least one of the ROM 35 and the storage device 37 stores a program to use the dispatch booking service of the autonomous vehicle 100. When the program is performed by the CPU 32 or other unit of the in-vehicle terminal 30, the functional blocks such as those shown in FIG. 2 are established in the in-vehicle terminal 30. Alternatively, the functional blocks such as those in FIG. 2 can also be established by executing the program stored in a non-transient computer-readable storage medium, such as a DVD, by the CPU 32 or other unit. The in-vehicle terminal 30 therefore includes, as functional blocks, a stop selector 41, a crowdedness estimator 42, a dispatcher 43, a congestion information acquirer 44, and a transceiver 45.

The stop selector 41 causes the touch panel 110 (refer to FIG. 12) of the in-vehicle terminal 30 to display candidates of the destination stop so that a passenger can select a destination stop at which the passenger plans to get off. As described further below, when the selected destination stop is within a congested section, the stop selector 41 makes it possible for the passenger to select, as an alternative stop, a stop earlier than the congested section. Similarly, when the mass transportation vehicle 10 is crowded, the stop selector 41 makes it possible for the passenger to select, as an alternative stop, a stop earlier than the selected destination stop.

The crowdedness estimator 42 estimates the crowdedness of the mass transportation vehicle 10 based on the vehicle interior images captured by the in-vehicle camera 19 of the mass transportation vehicle 10. The crowdedness estimator 42 may include a neural network which has learned using teacher data in which images of passengers are used as input images, whereas a class "passenger" is used as an output value (a correct value). Such a neural network enables the crowdedness estimator 42 to count the number of passengers in the images of passengers in the passenger compartment 80. The crowdedness estimator 42 calculates the crowdedness based on the counted number of passengers and the capacity of the passenger compartment 80.

The congestion information acquirer 44 obtains congestion information (transportation information) from an external transportation information center 95. As described further below, the congestion information acquirer 44 may obtain information about a destination stop selected by a passenger from the stop selector 41. The congestion information acquirer 44 may further obtain congestion information along the operation route from the current own-location, that is the current location of the mass transportation vehicle 10 in which the in-vehicle terminal 30 is disposed to the destination stop. The congestion information acquirer 44 may then determine whether the destination stop is within the congested section.

The dispatcher 43 can book dispatch of the autonomous vehicle 100 to which a passenger will transfer after getting off the mass transportation vehicle 10 at the destination stop. As described further below, when a passenger sets a destination stop, the dispatcher 43 generates and sends a dispatch request to an dispatch management device 50 via the transceiver 45. The dispatch request may include information about the destination stop, an identifier of the in-vehicle terminal 30 (that is, itself), and an identifier of the mass transportation vehicle 10 in which the in-vehicle terminal 30 is disposed. The dispatcher 43 sends the information about the destination stop to the dispatch management device 50 as information about a waiting point of the autonomous vehicle 100 booked for the dispatch.

The transceiver 45 serves as a receiver that receives signals sent to the in-vehicle terminal 30 from external entities, and a transmitter that sends signals from the in-vehicle terminal 30 to external entities. The transceiver 45 may send the dispatch request generated by the dispatcher 43 to the dispatch management device 50. The transceiver 45 also receives information about the dispatched vehicle from the dispatch management device 50.

Dispatch Management Device

The dispatch management device 50 of autonomous vehicles may be installed at a management company that provides operation services of the mass transportation vehicles 10 and the autonomous vehicles 100.

The dispatch management device 50 may be configured by a computer. As shown in FIG. 1, the dispatch management device 50 may include, as hardware components, an input/output controller 51, a CPU 52, an input unit 53, and a display 54. The dispatch management device 50 further includes, as storages, a ROM 55, a RAM 56, and a hard disk drive (HDD) 57. These elements are connected to an internal bus 58.

At least one of the ROM 55 and the HDD 57, both of which are storages, stores a dispatch booking program of the autonomous vehicles 100. With this program being executed by the CPU 52 or other unit of the dispatch management device 50, functional blocks as those in FIG. 2 are established in the dispatch management device 50. Alternatively, the functional blocks as those shown in FIG. 2 can be established also by executing the program stored in a non-transient computer-readable storage medium, such as a DVD, by the CPU 52.

The dispatch management device 50 therefore includes, as storage functional blocks, a mass transportation vehicle information storage 61, a map information storage 62, an in-vehicle terminal storage 63, and a dispatch schedule storage 64. The dispatch management device 50 includes, as operation functional blocks, a clock 65, a guide map provider 66, a fare calculator 67, a transceiver 68, and a dispatch booking setter 69.

The mass transportation vehicle information storage 61 stores vehicle information about the mass transportation vehicles 10 under control of the dispatch management device 50. The vehicle information may include an identifier (for example, a vehicle license number) of the mass transportation vehicle 10, an operation route, and an operation timetable.

The map information storage 62 stores dynamic map data. The dynamic map is a three dimensional map, in which, for example, locations and three dimensional shapes of roadways are stored. The three dimensional shapes of roadways include slopes and road widths. The dynamic map also stores locations of roadway indicators, such as lane markings, crosswalks, and stop lines. The dynamic map further stores locations and three dimensional shapes of structures, such as buildings around roadways and signals. The dynamic map further stores locations and shapes of parking lots.

The dynamic map may use a geographic coordinate system based on latitude and longitude. The guide map provider 66 extracts the dynamic map data from the map information storage 62 when the mass transportation vehicle 10 or the autonomous vehicle 100 autonomously travels.

The guide map provider 66 also prepares guide map data that includes travel routes of the mass transportation vehicle 10 and the autonomous vehicle 100, and sends the guide map data to the mass transportation vehicle 10 and the autonomous vehicle 100. The guide map data to be sent to the mass transportation vehicle 10 includes an operation route 97 and location information about stops A1 to A12

(refer to FIG. 8). The guide map data to be sent to the autonomous vehicle 100 includes location information about the destination stop, which is the waiting point (in other words, the boarding point), estimated boarding time, and scheduled time at which the autonomous vehicle 100 will start from the current location.

The in-vehicle terminal storage 63 stores terminal information about the in-vehicle terminals 30 disposed in the mass transportation vehicle 10. The terminal information includes an identifier of each in-vehicle terminal 30, an identifier of the mass transportation vehicle in which the in-vehicle terminal 30 is disposed, and a seat number to which the in-vehicle terminal 30 is attached.

The dispatch schedule storage 64 stores a dispatch booked schedule of the autonomous vehicles 100 controlled by the dispatch management device 50. The dispatch booked schedule includes an identifier (ID) of the autonomous vehicle 100 booked for the dispatch, a user (passenger) account of a person who booked the dispatch, the date of usage, estimated boarding time, a boarding point, and a destination.

The fare calculator 67 calculates fare for the use of the autonomous vehicle 100. The fare calculator 67 may calculate the fare for the user (passenger) who uses the autonomous vehicle 100 from the destination stop at which the user has alighted the mass transportation vehicle 10 to a destination of the autonomous vehicle 100. As described further below, the dispatch booking setter 69 sets the destination stop and books dispatch of the autonomous vehicle 100 in cooperation with the in-vehicle terminal 30. The dispatch booking setter 69 obtains information about the destination stop selected by the passenger and books the dispatch of the autonomous vehicle 100 to which the passenger transits at the selected destination stop.

Dispatch Booking Flow

Figure 10:
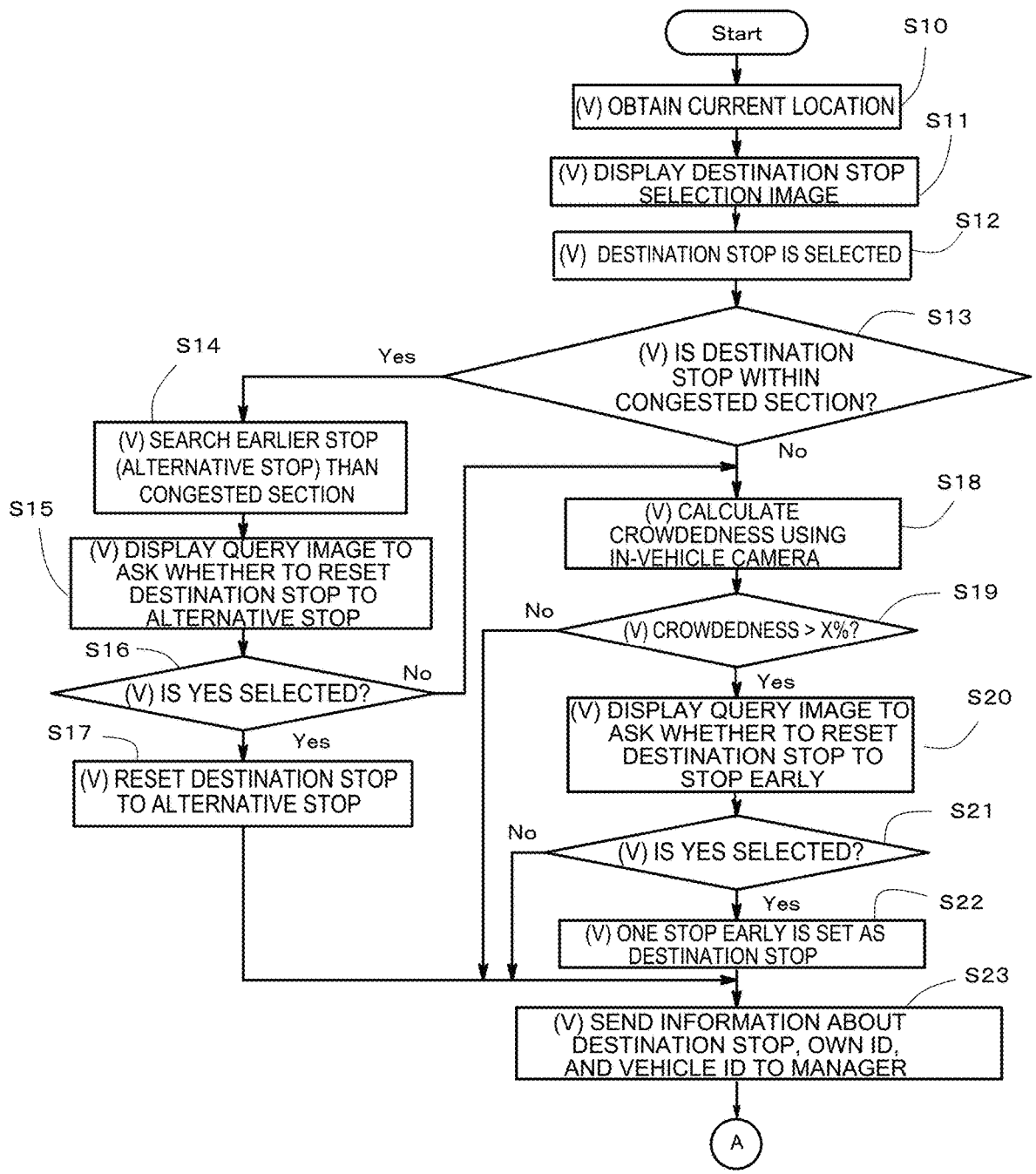
FIG. 10 is a flowchart of an example of dispatch booking using an in-vehicle terminal (1/2)
Figure 11:
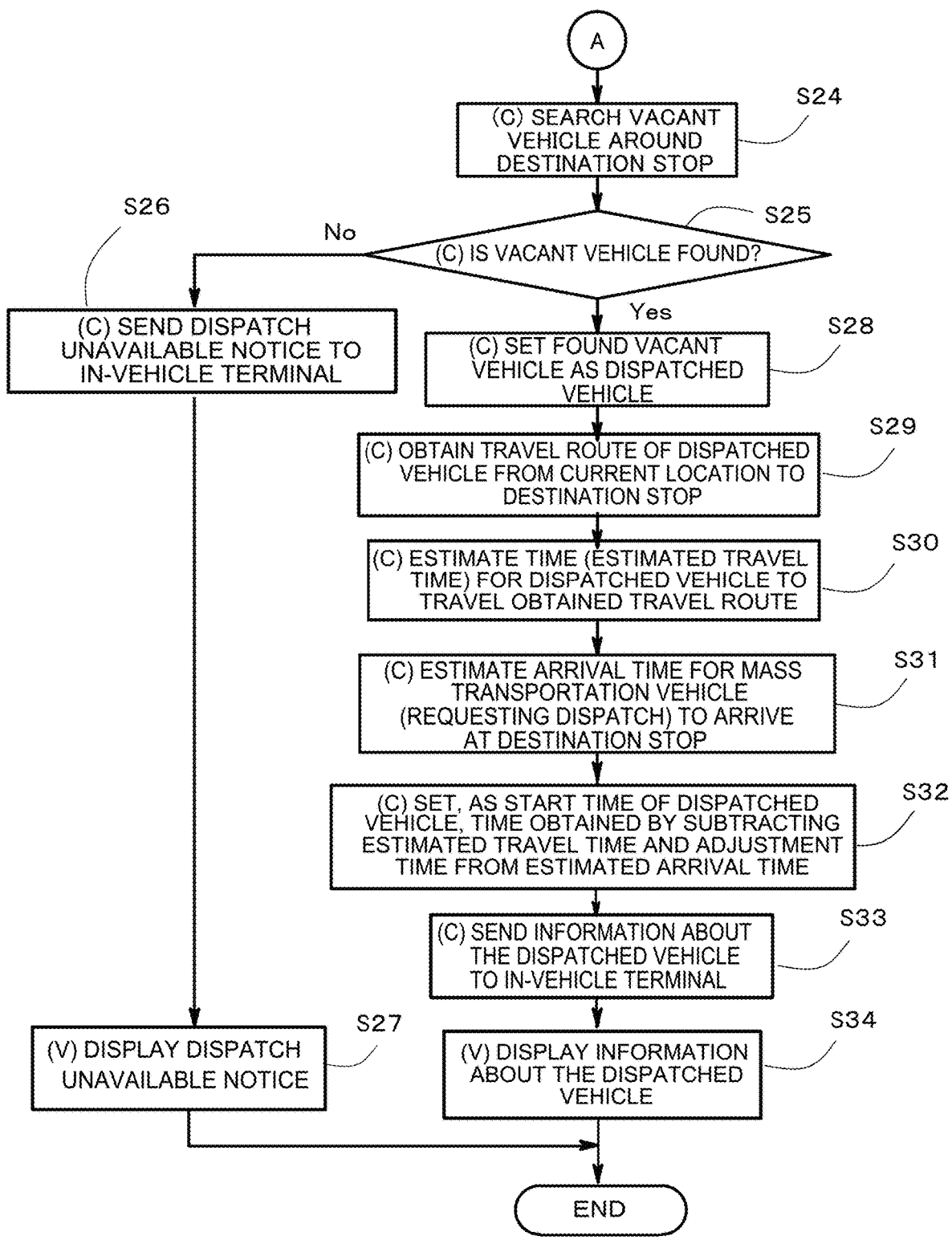
FIG. 11 is the flowchart of the example of dispatch booking using the in-vehicle terminal (2/2)

FIGS. 10 and 11 show examples of flowcharts of dispatch booking according to an embodiment of the present disclosure. The flowcharts show subjects which perform individual steps. Specifically, prefix "(V)" indicates steps performed by the in-vehicle terminal 30, whereas prefix "(C)" indicates steps performed by the dispatch management device 50. FIGS. 12 to 18 show images to be displayed on the touch panel 110 of the in-vehicle terminal 30 during the dispatch booking process. The images in FIGS. 12 to 17 are displayed on the touch panel 110 by the stop selector 41. The image in FIG. 18 is displayed on the touch panel 110 by the dispatcher 43.

When a passenger (user) on the mass transportation vehicle 10 starts the in-vehicle terminal 30, the steps in the flowcharts shown in FIGS. 10 and 11 begin. As shown in FIG. 12, the touch panel 110 of the in-vehicle terminal 30 shows an initial screen which displays a message 111 asking whether or not to use a transfer service to the autonomous vehicle 100, and operation buttons 112A (Yes) and 112B (No).

When the operation button 112A (Yes) is pressed by a passenger through a tap or other operation, the stop selector 41 (refer to FIG. 2) of the in-vehicle terminal 30 obtains the current location from the navigator 13 of the mass transportation vehicle 10 (S10).

The stop selector 41 also obtains an operation route and stop information from the guide map storage 74 of the mass transportation vehicle 10. The stop selector 41 further displays a destination stop selection image on the touch panel 110, shown as an example in FIG. 13 (S11).

In the destination stop selection image, all the stops of the mass transportation vehicle 10 are displayed. Also displayed on the touch panel 110 is a current location mark 113 that shows the current location of the mass transportation vehicle 10 along the operation route.

The stop selector 41 excludes, from the candidates for the destination stop, stops which are within a predetermined short distance from the current location. For example, the stop selector 41 excludes, from the destination stop candidates, two stops ahead from the current location along the operation routes. Time required to book dispatch can be ensured by excluding the stops within a short distance from the current location from the candidates for the destination stop.

A candidate frame 114 is assigned to the stops included in the candidates. One of the stops (stop A7 in this example) to which the candidate frame 114 is assigned is selectable by a passenger (S12). A highlight mark 115A is assigned to the selected stop A7.

Figure 14:
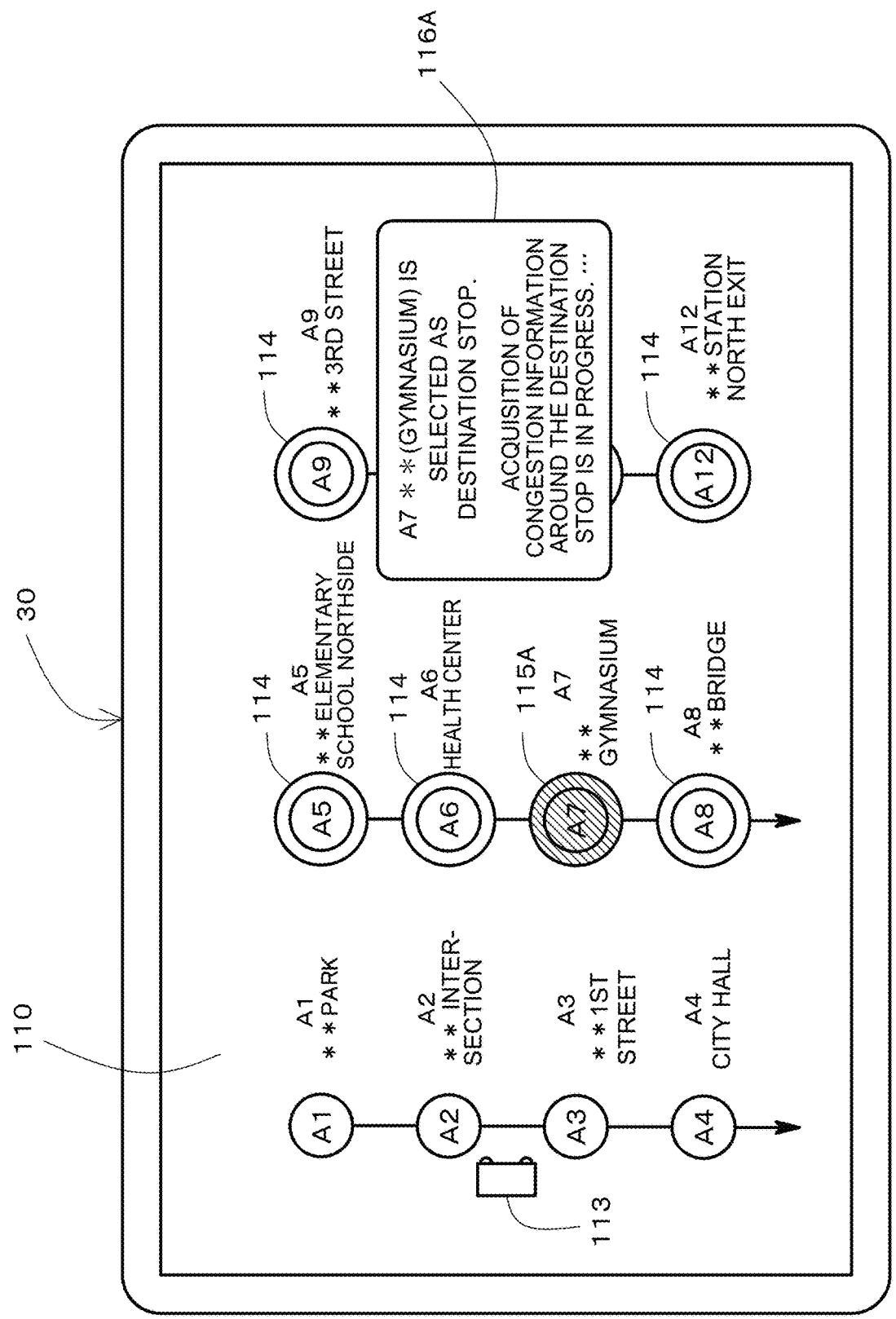
FIG. 14 is a diagram to describe the dispatch booking flow (3/7), showing an example of a screen to be displayed while acquisition of congestion information is in progress.

The stop selector 41 provides a reset function of the destination stop. In a destination stop reset process, the stop selector 41 displays a congestion information screen as shown in FIG. 14 on the touch panel 110. This screen shows a message box 116A in the stop selection screen. The message box 116A shows a message to indicate that a destination stop has been selected, and further that acquisition of the congestion information around the selected stop is in progress.

With the message box 116A being displayed, the congestion information acquirer 44 obtains congestion information from the external transportation information center 95. The congestion information acquirer 44 may obtain congestion information in a section from the current location to the selected destination stop along the operation route of the mass transportation vehicle 10. Congestion indicates a condition of traffic in which vehicle traffic is clogged on roadways, with the average vehicle speed under, for example, 10 km/h or lower.

The congestion information acquirer 44 further determines whether the destination stop is included within the congested section (S13). If so, the stop selector 41 extracts, as an alternative stop, a stop earlier than (nearer to the mass transportation vehicle 10) the congested section along the operation route of the mass transportation vehicle 10 (S14). The stop selector 41 may extract, as the alternative stop, the stop earlier than the congested section along the operation route and the nearest to the tail of the congested section, in other words, the stop immediately before the congested section.

Figure 15:
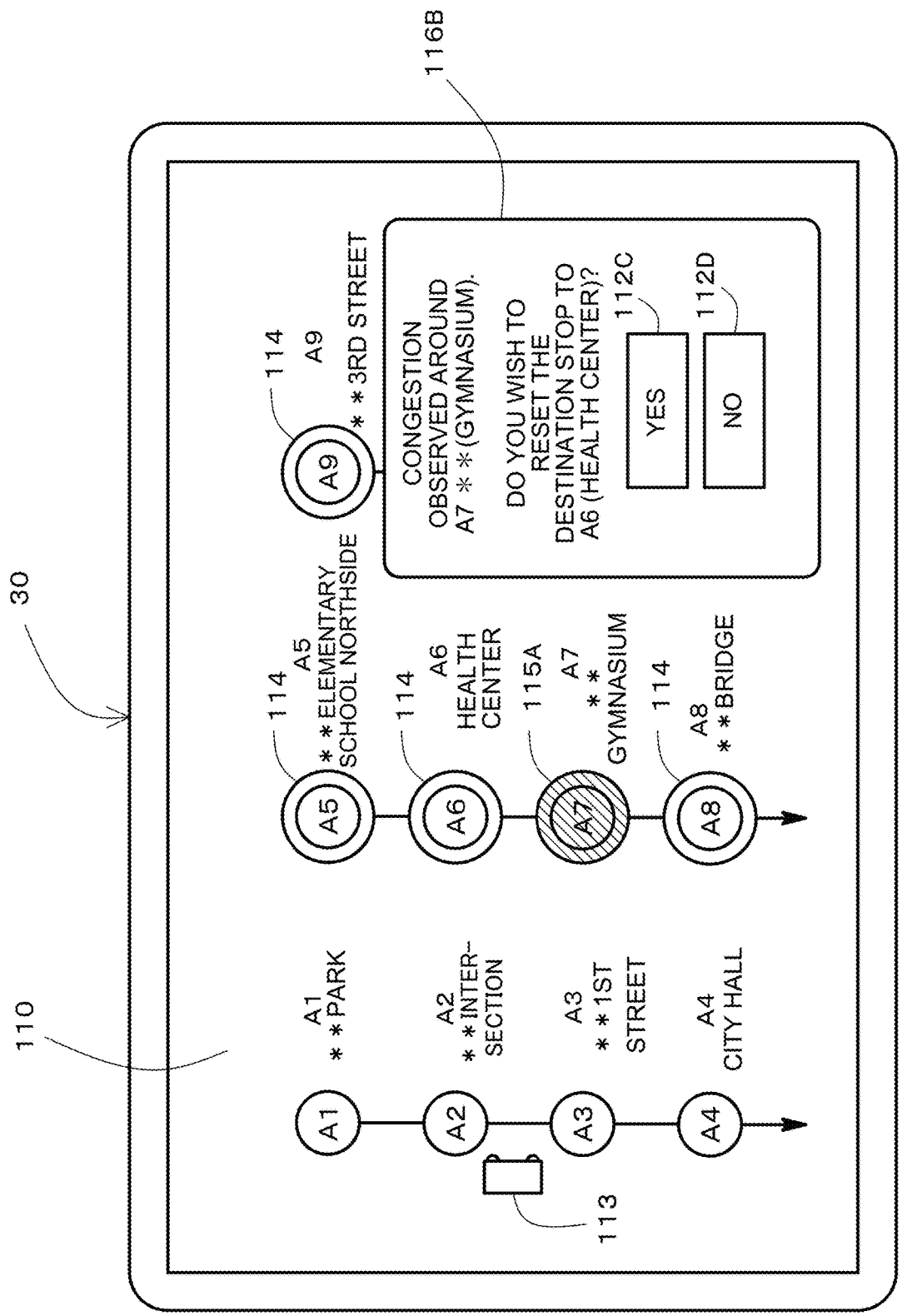
FIG. 15 is a diagram to describe the dispatch booking flow (4/7), showing an example of a screen to suggest an alternative destination stop to avoid congestion.

As shown in FIG. 15, the stop selector 41 shows a message box 116B on the touch panel 110 such that the message box 116B overlaps the stop selection image (S15). The message box 116B shows a message indicating that congestion is observed around the selected destination stop and asking whether or not to reset the destination stop to the alternative stop which is earlier than the congested section (a stop A6 in the example shown in FIG. 15). The message box 116B also shows operation buttons 112C (Yes) and 112D (No) to set whether or not to reset the destination stop.

Figure 16:
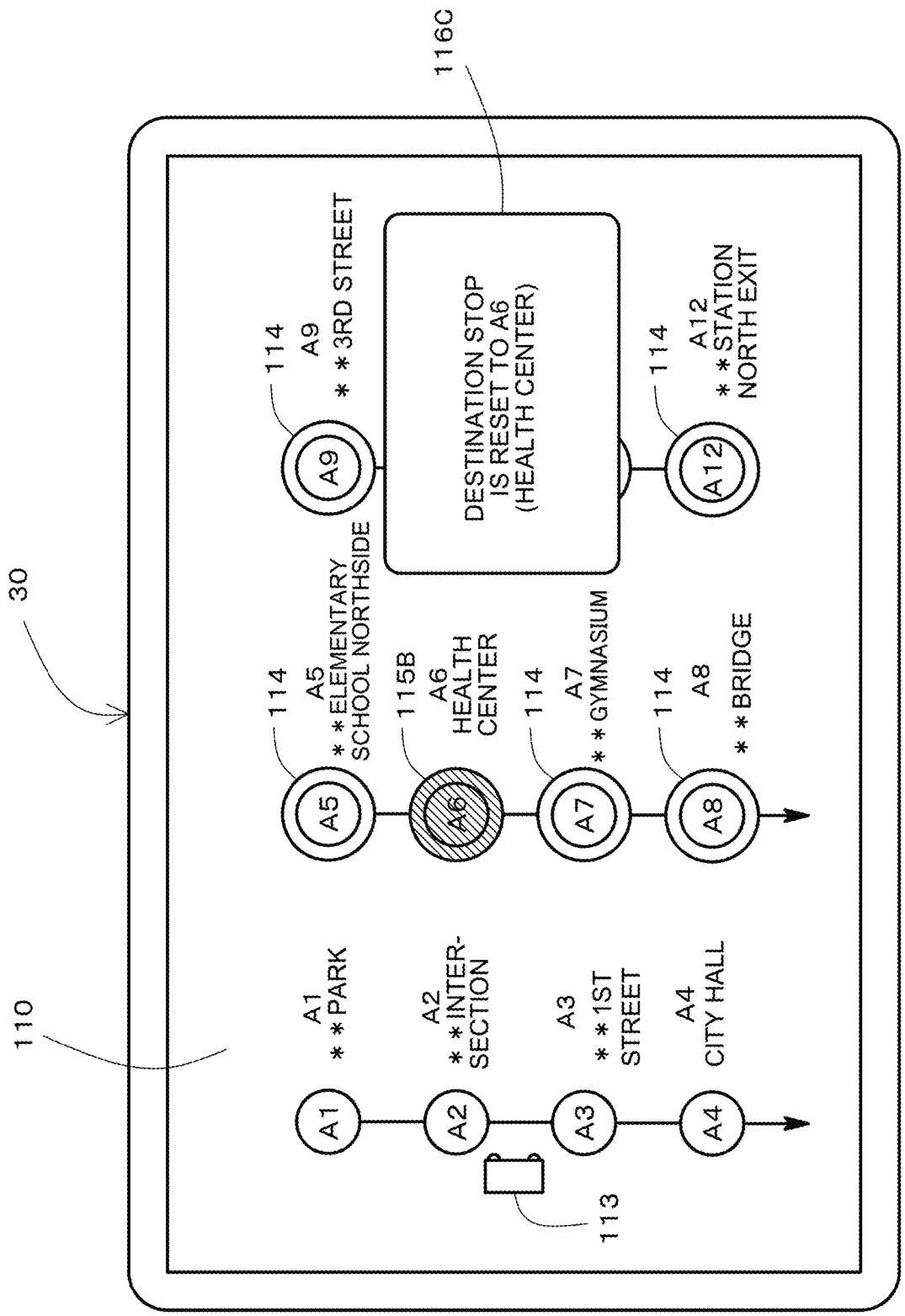
FIG. 16 is a diagram to describe the dispatch booking flow (5/7), showing an example of a screen to be displayed when the destination stop is finalized.

When the operation button 112C (Yes) is pressed through a tap or other operation on the touch panel 110 (S16), the stop selector 41 resets the destination stop to the newly selected stop A6 (S17). As shown in FIG. 16, the stop selector 41 displays, on the touch panel 110, a message box 116C showing a message that the destination stop is reset to the newly selected stop A6 (S17).

In contrast, when the destination stop is not included within the congested section in Step S13, or the alternative stop is not selected in Step S16, an alternative stop is determined in accordance with the crowdedness of the mass transportation vehicle 10. The in-vehicle camera 19 captures an interior image of the passenger compartment 80 (refer to FIG. 5). This captured image is sent to the crowdedness estimator 42.

The crowdedness estimator 42 counts the number of passengers in the passenger compartment 80 using the above neural network. The crowdedness estimator 42 also calculates the crowdedness (%) by dividing the counted number of passenger by the capacity of the passenger compartment 80 (S18). The crowdedness estimator 42 further determines whether the calculated crowdedness exceeds a predetermined threshold X (%) (S19). The threshold X may be set to, for example, 100%.

When the crowdedness is equal to or below the threshold X, the stop A7 selected by the passenger in Step S12 is finalized as the destination stop. In contrast, when the crowdedness exceeds the threshold X, the stop selector 41 extracts, as an alternative stop, a stop earlier than (nearer to the mass transportation vehicle 10) the stop A7 selected by the passenger, along the operation route of the mass transportation vehicle 10. The stop selector 41 may select, as an alternative stop, the stop A6, which is along the operation route of the mass transportation vehicle 10 and one stop earlier than the stop A7 selected by the passenger.

Figure 17:
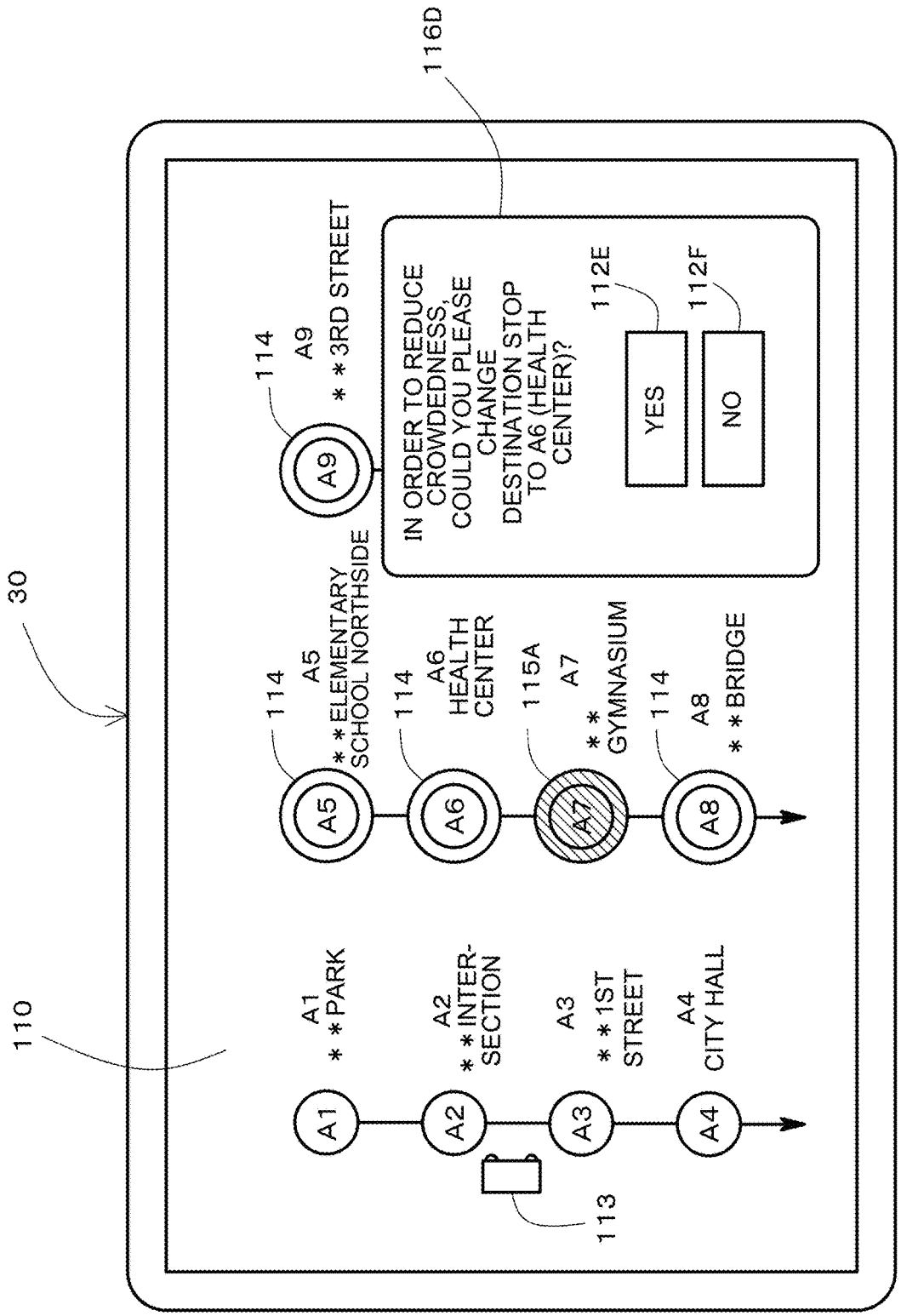
FIG. 17 is a diagram to describe the dispatch booking flow (6/7), showing an example of a screen to suggest an alternative destination stop to reduce the crowdedness of the mass transportation vehicle.
Figure 18:
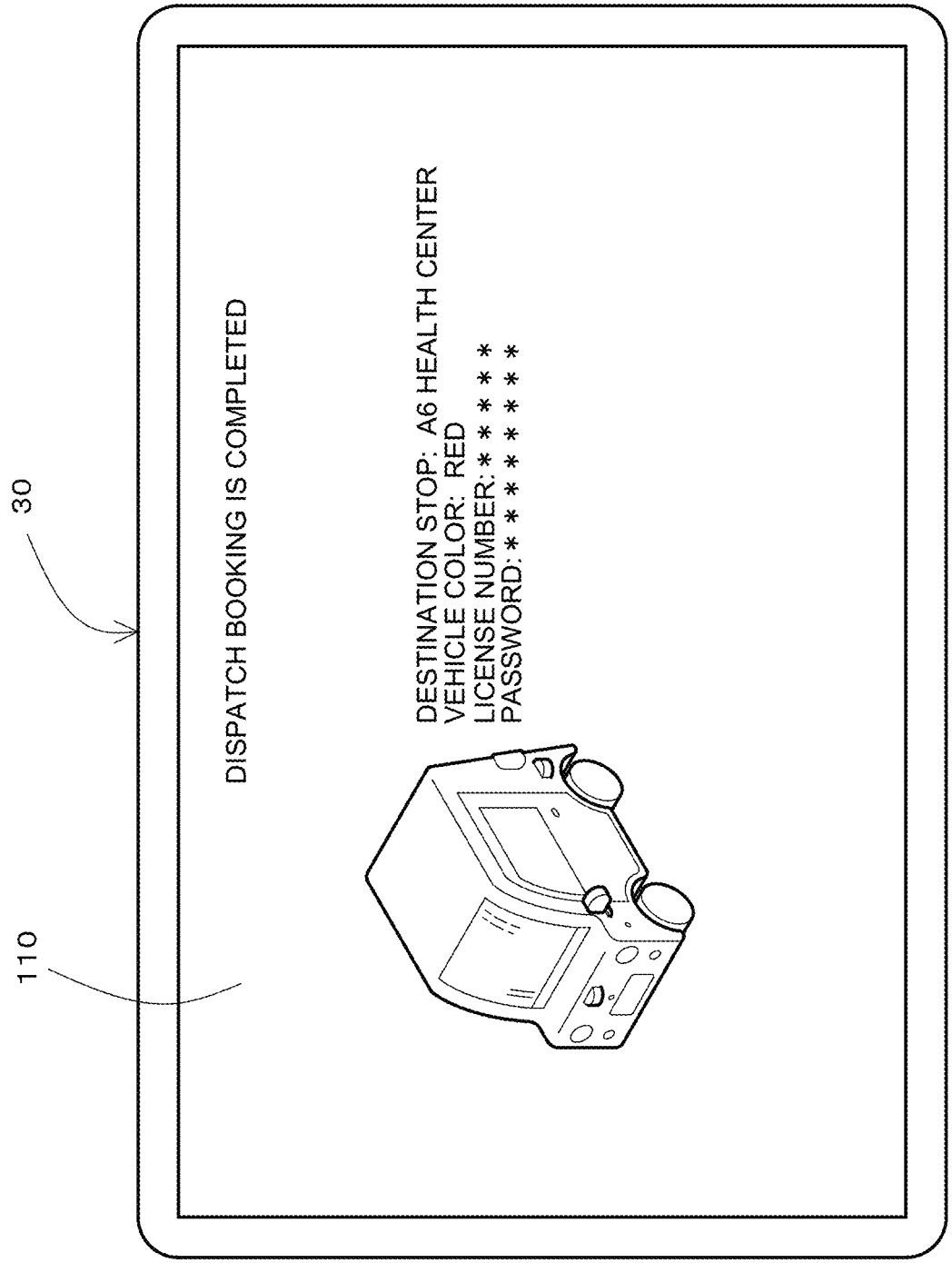
FIG. 18 is a diagram to describe the dispatch booking flow (7/7), showing an example of a screen which displays information about dispatched vehicle.

As an example shown in FIG. 17, the stop selector 41 shows a message box 116D on the touch panel 110 such that the message box 116D overlaps the stop selection image (S20). The message box 116D shows a message asking whether or not to reset the destination stop to the alternative stop A6 to reduce the crowdedness of the mass transportation vehicle 10. The message box 116D also shows operation buttons 112E (Yes) and 112F (No) to set whether or not to reset the destination stop.

When the operation button 112F (No) is pressed through a tap or other operation (S21), the stop A7 selected by the passenger is finalized as the destination stop. In contrast, when the operation button 112E (YES) is pressed through a tap or other operation by the passenger, the stop selector 41 resets the destination stop to the stop A6, which is one stop earlier than the stop A7 selected by the passenger (S22). Returning to FIG. 16, the stop selector 41 displays the message box 116C on the touch panel 110, showing a message that the destination stop is reset to the newly selected stop A6.

The dispatcher 43 sets the finalized destination stop in the dispatch request as the waiting point of the autonomous vehicle 100 booked for the dispatch. The dispatcher 43 further includes the identifier of the in-vehicle terminal 30 (that is, itself) and the identifier (for example, a vehicle license number) of the mass transportation vehicle 10 in which the in-vehicle terminal 30 is disposed. The generated dispatch request is sent to the dispatch management device 50 via the transceiver 45 (S23).

The dispatch booking setter 69 of the dispatch management device 50 receives the dispatch request via the transceiver 68. In response to the request, the dispatch booking setter 69 searches a vacant vehicle around the destination stop which has been set as the waiting point of the autonomous vehicle 100 (S24). In other words, the dispatch booking setter 69 searches the autonomous vehicle 100 which is around the destination stop and not booked for another dispatch.

The dispatch booking setter 69 may extract the autonomous vehicles 100 which are vacant, in other words, not booked for any other dispatch for a predetermined time period (for example, two hours) from the current time by querying the dispatch schedule storage 64. The dispatch booking setter 69 further obtains locations of the vacant autonomous vehicles 100 from the individual navigators 13 to find the autonomous vehicle 100 located within a predetermined distance (for example, within 500 m) from the destination stop.

When no vacant vehicles are found around the destination stop (S25), the dispatch booking setter 69 sends a dispatch unavailable notice to the in-vehicle terminal 30 via the transceivers 45, 68. The touch panel 110 of the in-vehicle terminal 30 displays the dispatch unavailable notice (S26). The touch panel 110 may display a message indicating that no autonomous vehicles matching the set conditions are found (S27).

In contrast, when a vacant vehicle is found around the destination stop, the dispatch booking setter 69 books the vacant vehicle for the dispatch (S28). The guide map provider 66 then obtains a travel route from the current location of the dispatched vehicle to the destination stop, which is the waiting point (S29).

The dispatch booking setter 69 obtains a travel route from the guide map provider 66 and calculates a time duration (estimated travel time) for the dispatched vehicle to travel along the travel route to the destination stop (S30). The estimated travel time may be calculated by referring to congestion information about the travel route obtained from the transportation information center 95 (refer to FIG. 2) and a rated speed of the autonomous vehicle 100.

The dispatch booking setter 69 further estimates arrival time at which the mass transportation vehicle 10 requesting the dispatch arrives at the destination stop (S31). The dispatch booking setter 69 may obtain the current time from the clock 65 and the congestion information about the operation route of the mass transportation vehicle 10 from the transportation information center 95. The estimated arrival time of the mass transportation vehicle 10 to arrive at the destination stop can be calculated based on not only such information but also the predetermined rated speed of the mass transportation vehicle 10 and dwell time at each stop.

The dispatch booking setter 69 sets, as start time of the dispatched vehicle, the time obtained by subtracting the estimated travel time and adjustment time from the estimated arrival time (S32). The adjustment time may be any time between 5 to 10 minutes.

The dispatch booking setter 69 sends information about the dispatched vehicle to the in-vehicle terminal 30 (S33). The information about the dispatched vehicle is received by the dispatcher 43 via the transceiver 45. As shown in FIG. 18, the dispatcher 43 displays the information about the dispatched vehicle in addition to a message notifying a completion of the dispatch booking on the touch panel 110 of the in-vehicle terminal 30 (S34). The information about the dispatched vehicle may include the destination stop, the color of the vehicle, the license number, and a password required to use the vehicle.

After the mass transportation vehicle 10 arrives at the destination stop and the passenger gets off, the passenger who is the user of the autonomous vehicle 100 transfers to the autonomous vehicle 100 which is waiting at the stop. The passenger is allowed to use the autonomous vehicle 100 after entering the password into an input device, such as a touch panel, disposed in the autonomous vehicle 100. In response to the input of a destination by the passenger, the autonomous vehicle 100 starts autonomous traveling to the destination.

A two-dimensional code, such as a QR code (registered trademark), may be displayed as the information about the dispatched vehicle in order to omit the password entering operation. The passenger who is the user of the autonomous vehicle 100 can capture the image of the two dimensional code using a photo function of a mobile terminal, such as the passenger's smartphone. When the passenger gets in the autonomous vehicle 100, the passenger presents the captured image of the two dimensional code to a decoder provided in the autonomous vehicle 100 to use the autonomous vehicle 100.

Another Embodiment of Dispatch System

Figure 19:
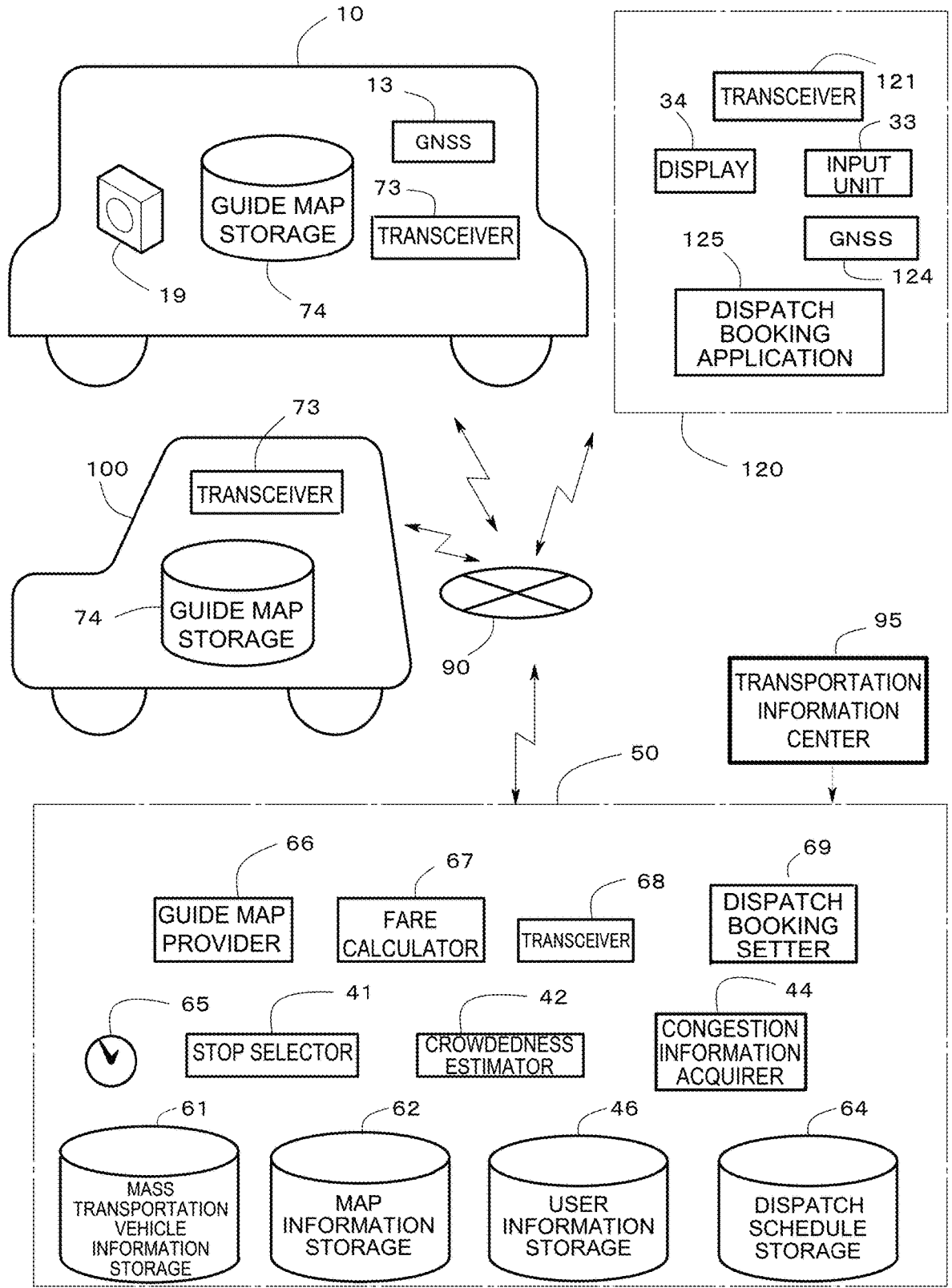
FIG. 19 is a functional block diagram of an autonomous vehicle dispatch system according to another embodiment of the present disclosure.

FIG. 19 shows another embodiment of the autonomous vehicle dispatch system according to the present disclosure. In the embodiment of the dispatch system shown in FIG. 2, the destination stop is set through the in-vehicle terminal 30. In the embodiment shown in FIG. 19, the setting is made by the dispatch management device 50. Dispatch is booked through the in-vehicle terminal 30 disposed in the mass transportation vehicle 10 in the dispatch system shown in FIG. 2, whereas, in the embodiment shown in FIG. 19, dispatch is booked through a user terminal 120, which is a passenger's mobile terminal.

The user terminal 120 may be a smartphone. In addition to the hardware components of the in-vehicle terminal 30 in the embodiment shown in FIG. 1, the user terminal 120 includes a measuring unit 124 (refer to FIG. 19). A global navigation satellite system (GNSS) may be used as the measuring unit 124. The user terminal 120 includes the touch panel 110 shown in FIGS. 12 to 18 as the input unit 33 and the display 34.

At least one of the ROM 35 (refer to FIG. 1) and the storage device 37, both of which are storages, stores a program to use the dispatch booking service of the autonomous vehicle 100. When the program is executed by the CPU 32 or other unit of the user terminal 120, the functional blocks as those shown in FIG. 19 are established in the user terminal 120. Alternatively, the functional blocks as those shown in FIG. 19 can be established also by executing the above program stored in a non-transient computer-readable storage medium, such as a DVD, by the CPU 32. The user terminal 120 thus includes a transceiver 121 and a dispatch booking application 125, as functional blocks.

In the dispatch management device 50, at least one of the ROM 55 and the HDD 57, both of which are storages, stores a program to use the dispatch booking service of the autonomous vehicle 100. When the program is executed by the CPU 52 or other unit of the dispatch management device 50, the functional blocks as those shown in FIG. 19 are established in the dispatch management device 50. Alternatively, the functional blocks as those shown in FIG. 19 can be established also by executing the above program stored in a non-transient computer-readable storage medium, such as a DVD, by the CPU 52.

In addition to the functional blocks shown in FIG. 2, the stop selector 41, the crowdedness estimator 42, the congestion information acquirer 44, and a user information storage 46 are established in the vehicle dispatch management device 50. The stop selector 41, the crowdedness estimator 42, and the congestion information acquirer 44 perform similar functions as the functional operation blocks of the in-vehicle terminal 30 shown in FIG. 2.

The user information storage 46 stores information about the passenger who is the user of the user terminal 120. The user information may include a user name, an account name, a usage record, an address, contact information, a driver's license number, a credit card number, and a password to login to the dispatch booking application 125. The account name is a name (a member name) to identify the user when the user utilizes the dispatch booking application 125. For example, an email address can be used as the account name.

Dispatch Booking

Figure 20:
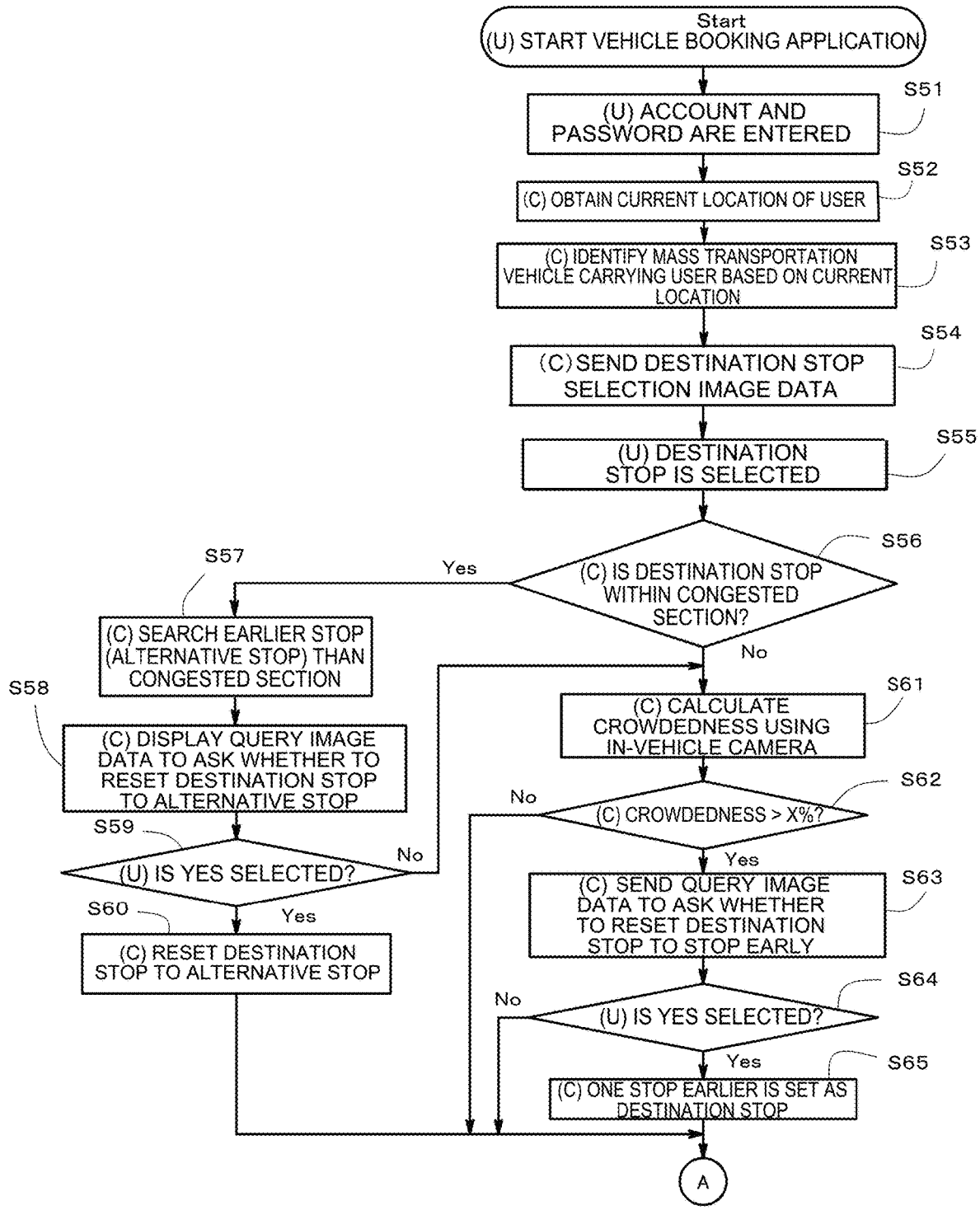
FIG. 20 is a flowchart (1/2) of a dispatch booking using the autonomous vehicle dispatch system according to the other embodiment of the present disclosure.
Figure 21:
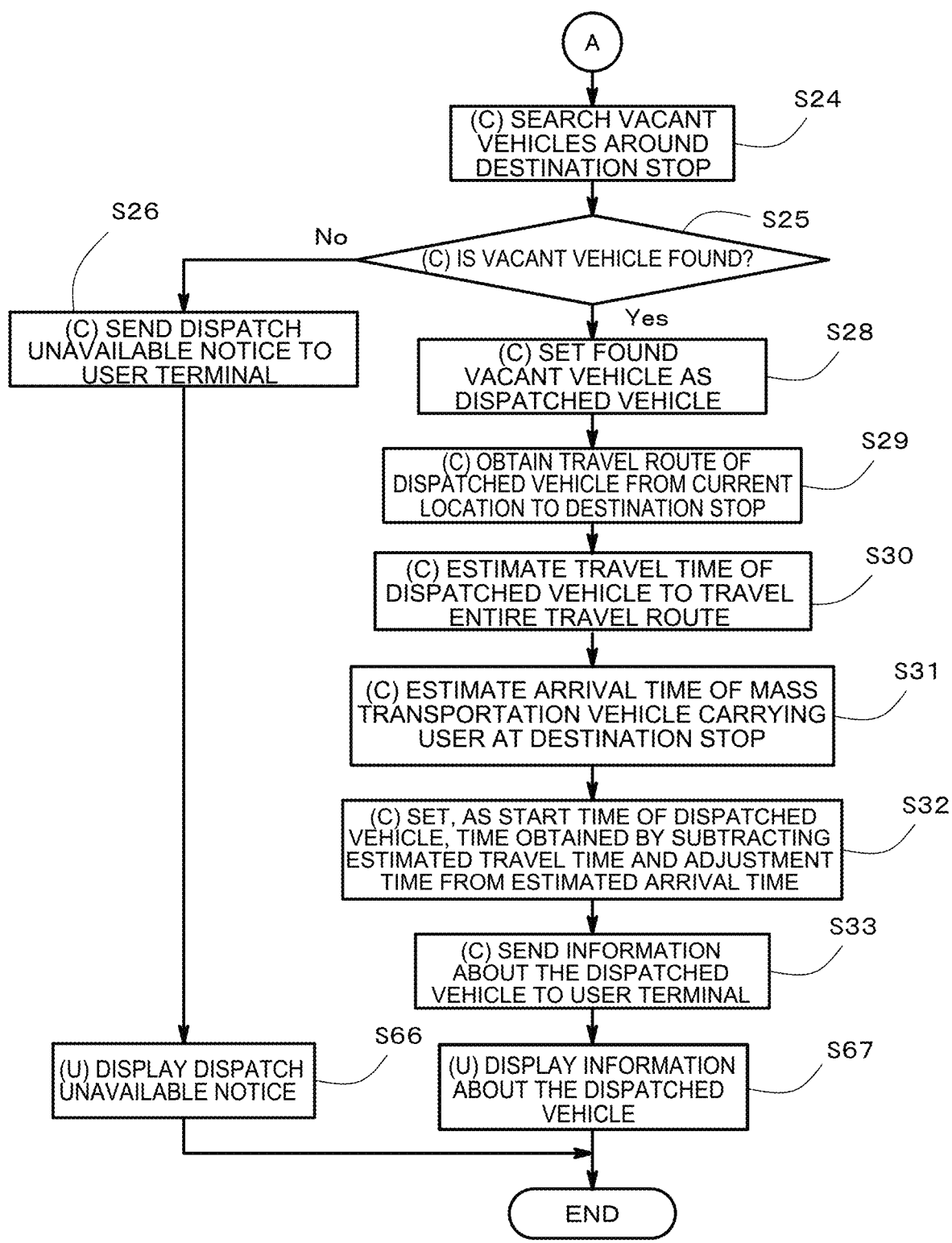
FIG. 21 is the flowchart (2/2) of the dispatch booking using the autonomous vehicle dispatch system according to the other embodiment of the present disclosure.

FIGS. 20 and 21 show dispatch booking flowcharts using the dispatch system according to the embodiment shown in FIG. 19. In FIGS. 20 and 21, prefix "(U)" indicates steps performed by the user terminal 120, whereas prefix "(C)" indicates steps performed by the dispatch management device 50.

As shown in FIGS. 19 to 21, when a user (passenger) starts the dispatch booking application 125 implemented in the user terminal 120, the display 34 shows an entry form (not shown) to enter an account and a password. When the user inputs the account and the password, the input information is sent to the dispatch booking setter 69 of the vehicle dispatch management device 50 via the transceiver 68, 121.

The dispatch booking setter 69 matches the received information, such as the account and the password, with the corresponding information stored in the user information storage 46. When matched, the dispatch booking setter 69 obtains the current location of the user terminal 120 from the measuring unit 124 (S52).

The dispatch booking setter 69 identifies the mass transportation vehicle 10 which carries the user based on the obtained current location of the user terminal 120 (S53). The dispatch booking setter 69 may obtain the current locations of all the mass transportation vehicles 10 currently in service and identify the mass transportation vehicle 10 which is at the nearest location to the current location of the user terminal 120, as the vehicle which carries the user.

In subsequent Steps S54 to S65, the similar steps as Steps S11 to S22 shown in FIG. 10 are performed by the stop selector 41, the crowdedness estimator 42, the congestion information acquirer 44, and the dispatch booking setter 69 of the dispatch management device 50. However, in Steps S54, S58, and S63, the stop selector 41 of the dispatch management device 50 sends image data to the remote user terminal 120. The sent image data is received by the dispatch booking application 125. In response, the dispatch booking application 125 displays screens on the touch panel 110 as those shown in FIGS. 12 to 18.

The vehicle to be dispatched is assigned as shown in FIG. 21 after the destination stop is determined in Steps S60 and S65. The dispatch booking setter 69 sets the destination stop selected by the passenger as the waiting point of the autonomous vehicle 100. In steps S24, and S26 to S33, similar steps to the steps of the same numbers in FIG. 11 are performed. In Steps S66 and S67, the steps performed by the in-vehicle terminal 30 in FIG. 11 are performed by the user terminal 120.

With the present embodiment, because the autonomous vehicle 100 can be called to the destination stop even when the mass transportation vehicle 10 include no in-vehicle terminal 30, a smooth transfer can be achieved without the in-vehicle terminals 30. The present disclosure is not limited to the above embodiments, and includes any changes and modifications which can be made without departing from the technical scope or the essence of the present disclosure defined by the claims.

The invention claimed is:

1. A mass transportation vehicle configured for travelling along a predefined operation route, passengers of the mass transportation vehicle getting on and off at stops located along the operation route, the mass transportation vehicle comprising:

an in-vehicle terminal including a processor, the processor including:

a stop selector configured to enable a passenger on the mass transportation vehicle to select, from the stops, a destination stop at which the passenger plans to get off;

a dispatcher configured to book dispatch of an autonomous vehicle to which the passenger transfers after getting off the mass transportation vehicle at the destination stop; and a crowdedness estimator configured to
    count a number of passengers in a passenger compartment of the mass transportation vehicle, and
    estimate a crowdedness in the passenger compartment based on the counted number of passengers and a capacity of the passenger compartment, a threshold being set for the crowdedness, wherein the stop selector is configured to
    in response to the crowdedness exceeding the threshold, extract, as an alternative destination stop, a stop earlier than the destination stop along the operation route,
    output a message to invite the passenger to set the alternative destination stop as a new destination stop, the message including a text which indicates the crowdedness in the passenger compartment, and
    perform a reset function to set the alternative destination stop as the new destination stop, in response to the passenger's input to set the alternative destination stop as the new destination stop, the dispatcher is configured to, in response to the alternative destination stop being set as the new destination stop, send information about the new destination stop to an autonomous vehicle dispatch management device as information about a waiting point of the autonomous vehicle for the passenger's transfer from the mass transportation vehicle to the autonomous vehicle, the mass transportation vehicle further includes a controller configured to control the travelling of the mass transportation vehicle, and the in-vehicle terminal is disposed on a rear surface of a seatback of a seat, on an opposite side of a back supporting surface of the seatback of the seat in the passenger compartment.

2. The mass transportation vehicle according to claim 1, wherein the processor further includes a congestion information acquirer configured to acquire congestion information about the operation route from a current location of the mass transportation vehicle to the destination stop, and the stop selector is configured to, in response to the destination stop being within a congested section, extract, as the alternative destination stop, a stop earlier than the congested section along the operation route.

3. The mass transportation vehicle according to claim 1, wherein the stop selector is configured to exclude, from candidates of the destination stop, a stop within a predetermined short distance from a current location of the mass transportation vehicle.

4. An autonomous vehicle dispatch management device, comprising:

a processor including:
    a stop selector configured to send a selection image to a mobile terminal carried by a passenger on a mass transportation vehicle traveling along a predefined operation route, the selection image allowing the passenger to select a destination stop at which the passenger plans to get off;

a dispatch booking setter configured to obtain information about the selected destination stop and book dispatch of an autonomous vehicle to which the passenger transfers at the destination stop; and a crowdedness estimator configured to
    count a number of passengers in a passenger compartment of the mass transportation vehicle, and
    estimate a crowdedness in the passenger compartment based on the counted number of passengers and a capacity of the passenger compartment, a threshold being set for the crowdedness, wherein the stop selector is configured to
    in response to the crowdedness exceeding the threshold, extract, as an alternative destination stop, a stop earlier than the destination stop along the operation route,
    output a message to invite the passenger to set the alternative destination stop as a new destination stop, the message including a text which indicates the crowdedness in the passenger compartment, and
    perform a reset function to set the alternative destination stop as the new destination stop, in response to the passenger's input to set the alternative destination stop as the new destination stop, and the dispatch booking setter is configured to, in response to the alternative destination stop being set as the new destination stop, set the information about the alternative destination stop as information about a waiting point of the autonomous vehicle for the passenger's transfer from the mass transportation vehicle to the autonomous vehicle, the mass transportation vehicle includes a controller configured to control the travelling of the mass transportation vehicle, and the autonomous vehicle dispatch management device is configured to be disposed on a rear surface of a seatback of a seat, on an opposite side of a back supporting surface of the seatback of the seat in the passenger compartment.

5. The autonomous vehicle dispatch management device according to claim 4, wherein the processor further includes a congestion information acquirer configured to acquire congestion information about the operation route from a current location of the mass transportation vehicle to the destination stop, the stop selector is configured to extract, in response to the destination stop being within a congested section, as an alternative stop, a stop earlier than the congested section along the operation route, and the dispatch booking setter is configured to set the new destination stop as the waiting point of the autonomous vehicle.

6. The autonomous vehicle dispatch management device according to claim 4, wherein the stop selector is configured to exclude, from candidates of the destination stop, a stop within a predetermined short distance from a current location of the mass transportation vehicle.

7. The mass transportation vehicle according to claim 2, wherein the stop selector is configured to exclude, from candidates of the destination stop, a stop within a predetermined short distance from a current location of the mass transportation vehicle.

8. The mass transportation vehicle according to claim 2, wherein the stop selector is configured to estimate the crowdedness in the passenger compartment based on the counted number of passengers and the capacity of the passenger compartment in response to the destination stop being outside the congested section.

9. The mass transportation vehicle according to claim 8, further comprising:
- an in-vehicle camera,
  - wherein the crowdedness estimator is configured to count the number of passengers in the passenger compartment of the mass transportation vehicle based on vehicle interior images captured by the in-vehicle camera.

* * * * *